US012563264B2

(12) United States Patent (10) Patent No.: US 12,563,264 B2
Watson et al. (45) Date of Patent: Feb. 24, 2026

(54) TECHNIQUES FOR REUSING PORTIONS OF ENCODED ORIGINAL VIDEOS WHEN ENCODING LOCALIZED VIDEOS

(71) Applicant: NETFLIX, INC., Los Gatos, CA (US)

(72) Inventors: Mark Watson, San Francisco, CA (US); Christopher Newton, Westlake Village, CA (US)

(73) Assignee: NETFLIX, INC., Los Gatos, CA (US)

( * ) Notice: Subject to any disclaimer, the term of this patent is extended or adjusted under 35 U.S.C. 154(b) by 213 days.

(21) Appl. No.: 17/834,399

(22) Filed: Jun. 7, 2022

(65) Prior Publication Data

US 2023/0396837 A1 Dec. 7, 2023

(51) Int. Cl.
*H04N 21/4402* (2011.01)
*H04N 21/44* (2011.01)

(52) U.S. Cl.
CPC ... *H04N 21/4402* (2013.01); *H04N 21/44008* (2013.01)

(58) Field of Classification Search
CPC ......... H04N 21/4402; H04N 21/44008; H04N 21/25841; H04N 21/234327; H04N 21/23439; H04N 21/816; H04N 19/30
See application file for complete search history.

(56) References Cited

U.S. PATENT DOCUMENTS

| | | | | |
|---|---|---|---|---|
| 2003/0169932 A1* | 9/2003 | Li | ............ | G06T 9/004 |
| | | | | 382/239 |
| 2008/0152006 A1* | 6/2008 | Chen | .......... | H04N 19/187 |
| | | | | 375/240.13 |
| 2010/0321579 A1* | 12/2010 | Ahmad | ......... | G06F 9/30065 |
| | | | | 348/E5.077 |
| 2012/0307904 A1* | 12/2012 | Yi | ........... | H04N 19/164 |
| | | | | 375/E7.243 |

(Continued)

FOREIGN PATENT DOCUMENTS

| | | |
|---|---|---|
| JP | 2016-092837 A | 5/2016 |
| JP | 2022-053534 A | 4/2022 |

(Continued)

OTHER PUBLICATIONS

International Search Report for Application No. PCT/US2023/023116 dated Jul. 14, 2023.

(Continued)

*Primary Examiner* — John W Miller
*Assistant Examiner* — Akshay Doshi
(74) *Attorney, Agent, or Firm* — Artegis Law Group, LLP

(57) ABSTRACT

In various embodiments, a localized video encoding application encodes localized videos. In operation, the localized video encoding application computes a prediction frame based on a target frame of a localized video and at least a portion of a reference frame of a decoded original video. The localized video encoding application computes a residual frame based on the prediction frame and the target frame of (Continued)

the localized video. The localized video encoding application performs one or more encoding operations on the residual frame to generate a frame of an encoded localization layer. The frame of the encoded localization layer and at least one frame of an encoded original video are subsequently transmitted to another device for decoding.

21 Claims, 3 Drawing Sheets

(56) References Cited

U.S. PATENT DOCUMENTS

| | | | | | |
|---|---|---|---|---|---|
| 2014/0192881 | A1* | 7/2014 | Xu | ........................ | H04N 19/52 |
| | | | | | 375/240.16 |
| 2015/0117515 | A1* | 4/2015 | Fu | ........................ | H04N 19/17 |
| | | | | | 375/240.02 |
| 2015/0134782 | A1 | 5/2015 | Arana et al. | | |
| 2016/0127728 | A1 | 5/2016 | Tanizawa et al. | | |
| 2016/0316215 | A1* | 10/2016 | Minoo | ................. | H04N 19/176 |
| 2018/0199081 | A1* | 7/2018 | Silverman | .............. | H04N 21/84 |
| 2022/0400270 | A1* | 12/2022 | Meardi | ................ | H04N 19/186 |

FOREIGN PATENT DOCUMENTS

| | | | |
|---|---|---|---|
| WO | 2013/021643 | A1 | 2/2013 |
| WO | 2023/106259 | A1 | 6/2023 |

OTHER PUBLICATIONS

Hoangvan et al., "Versatile Video Coding Based Quality Scalability With Joint Layer Reference", IEEE Signal Processing Letters, DOI: 10.1109/LSP.2020.3039729, vol. 27, Nov. 23, 2020, pp. 2079-2083.

* cited by examiner

TECHNIQUES FOR REUSING PORTIONS OF ENCODED ORIGINAL VIDEOS WHEN ENCODING LOCALIZED VIDEOS

BACKGROUND

Field of the Various Embodiments

The various embodiments relate generally to computer science and streaming video technology and, more specifically, to techniques for reusing portions of encoded original videos when encoding localized videos.

Description of the Related Art

In a process known as "video localization," an original video is modified to generate a localized video that conforms more to a target audience. For example, lip reanimation techniques can be used to modify the lip movements of speakers in a movie produced in English to align with French dubbing for the movie to generate a localized version of the movie that conforms more to a French-speaking audience. Usually, most of the video data included in a localized video is "original" video data that is unchanged from the corresponding original video, and the remaining video data is "localized" video data that is more customized for the target audience. A typical video streaming service does not distinguish between localized videos and original videos when streaming videos to end-user devices.

In some streaming implementations, video encoders are used to encode "chunks" of videos to generate encoded video chunks that are smaller than the original video chunks. The encoded video chunks are then stored on an origin server device and streamed to end-user devices on-demand via a content delivery network (CDN). In many implementations, to playback a given video, an end-user device executes a playback application that transmits a sequence of requests for the encoded video chunks associated with the given video to an edge server device that is included in the CDN and resides closer to the end-user device than the origin server device. For each such request, if the edge server device has a copy of the requested encoded video chunk stored in an associated cache memory, then a "cache hit" occurs, and the edge server device transmits the requested encoded video chunk to the playback application. Otherwise, a "cache miss" occurs, and the edge server device retrieves the requested encoded video chunk from the origin server device and then transmits the requested encoded video chunk to the playback application. As the various encoded video chunks are received by the playback application, a video decoder decodes the encoded video chunks to generate corresponding decoded video chunks that are then played back via the end-user device.

When considering the process of streaming localized videos, as opposed to original videos, one drawback of using conventional encoders to encode chunks of localized videos is that any original video data replicated in the chunks of a localized video is typically redundantly re-encoded. More specifically, original video data that is retained in a localized video is encoded once when generating encoded video chunks for the original video and again when generating encoded video chunks for the localized video. As a result, the total size of a conventional encoded localized video is comparable to the size of a corresponding encoded original video and, accordingly, is generally disproportionately large relative to the amount of localized video data present in the encoded localized video. Consequently, the amount of memory used to store the encoded video chunks for a localized video is needlessly high. Further, because the sizes of the cache memories used in edge server devices are usually substantially smaller than the total size of all of the encoded video chunks associated with a library of videos that are stored on an origin server device and available for streaming, the ratio of cache hits to cache misses (the "cache efficiency") of a CDN oftentimes is decreased disproportionately relative to the amount of localized video data present in an encoded localized video. Given that cache efficiency reductions can result in increased transmission delays, decreased effective transmission rates, and decreased transmission reliability when streaming videos, any decrease in the cache efficiency of a CDN can reduce the quality of experience (QoE) for end-users.

To reduce the amount of original video data that is re-encoded when encoding localized videos, in some implementations, any localized video chunk that is identical to an original video chunk is simply not encoded. Instead, metadata is used to indicate that the corresponding encoded original video chunk is to be reused as the encoded localized video chunk. Any localized video chunk that is not identical to an original video chunk is encoded to generate a corresponding encoded localized video chunk. One drawback of this approach, though, is that oftentimes many of the chunks of a localized video have only minor differences relative to the corresponding chunks of an original video. In such instances, a relatively large amount of original video data ends up being re-encoded when encoding the chunks of localized video. For example, when chunks of localized video are generated using lip-reanimation techniques, almost all of the chunks of localized video end-up having only small modifications to the lips of speakers in at least one frame relative to the corresponding chunks of the original video. The rest of the data in the chunks of localized video, outside of the lip modifications, is usually identical to the data in the chunks of original video. Thus, when the chunks of localized video are encoded, a large percentage of the original video data is still re-encoded as well and hence needs to be also redundantly transmitted and stored.

As the foregoing illustrates, what is needed in the art are more effective techniques for encoding localized videos.

SUMMARY

One embodiment sets forth a computer-implemented method for encoding localized videos. The method includes computing a prediction frame based on a target frame of a localized video and at least a portion of a reference frame of a decoded original video; computing a residual frame based on the prediction frame and the target frame of the localized video; performing one or more encoding operations on the residual frame to generate a frame of an encoded localization layer; and transmitting the frame of the encoded localization layer and at least one frame of an encoded original video to another device for decoding.

At least one technical advantage of the disclosed techniques relative to the prior art is that, with the disclosed techniques, the amount of original video data that is re-encoded when encoding a localized video can be reduced. In that regard, each frame of an encoded localization layer can specify the reuse of any number of portions (including all) of a frame of corresponding decoded original video. As a result, the amount of memory used to store the encoded localization layer chunks that are used to construct the encoded localized video chunks can be substantially reduced relative to what would be required to store the encoded localized video chunks using prior art techniques. Another advantage of the disclosed techniques is that storing encoded localization layer chunks instead of encoded localized video chunks in order to stream localized videos via a CDN can increase the cache efficiency of the CDN and, in turn, the QoE for end-users. These technical advantages provide one or more technical advancements over prior art approaches.

BRIEF DESCRIPTION OF THE DRAWINGS

So that the manner in which the above-recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
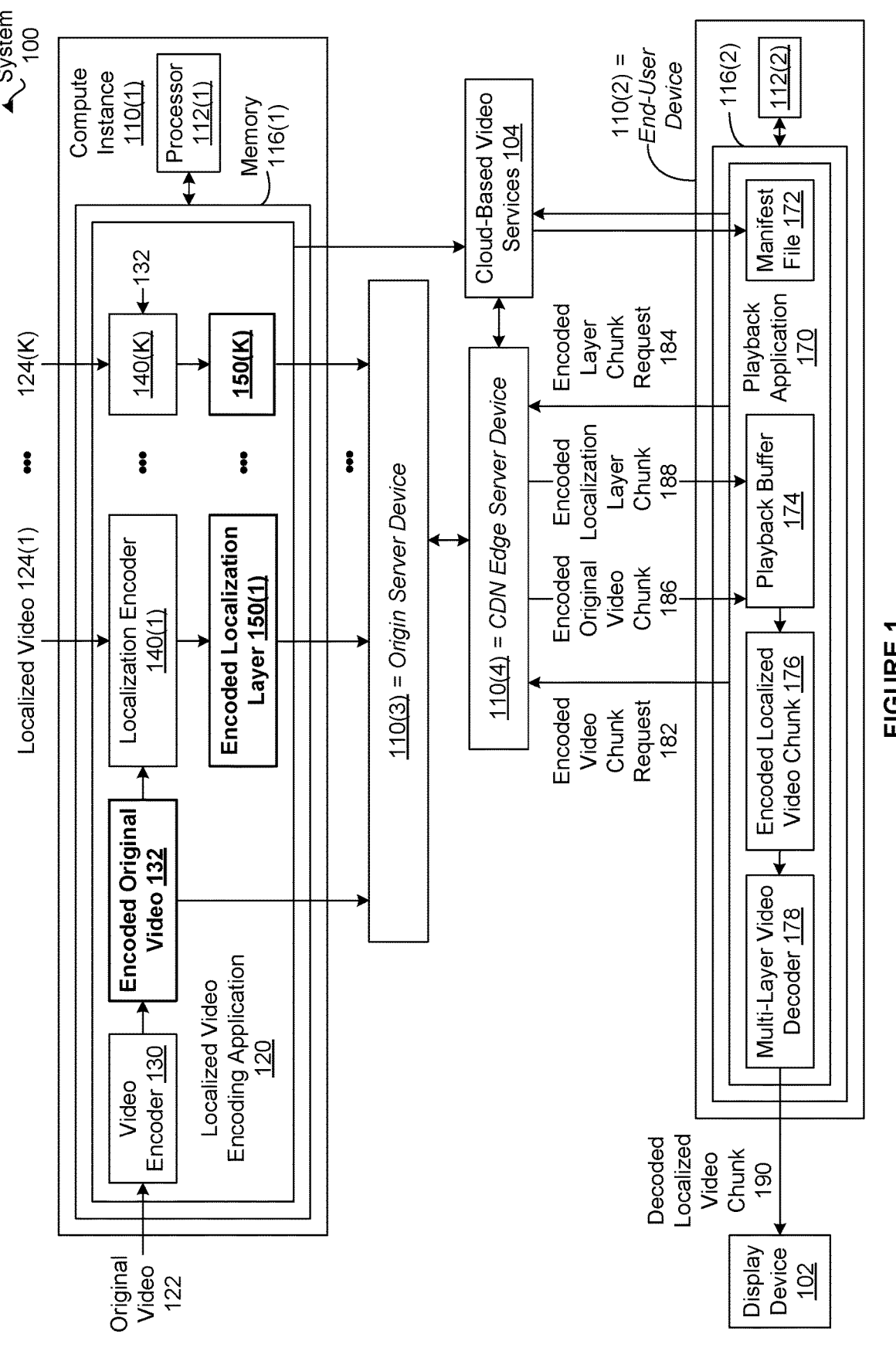
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

In video localization, an original video is modified to generate one or more localized videos that conform more to corresponding target audiences. For example, lip reanimation techniques can be used to modify the lip movements of speakers in a movie produced in English to align with dubbing for the movie in thirty languages to generate thirty localized versions of the movie. Usually, most of the video data included in a localized video is original video data that is unchanged from the corresponding original video, and the remaining video data is localized video data that is more customized for the target audience. A typical video streaming service does not distinguish between localized videos and original videos when streaming videos to end-user devices.

In some streaming implementations, video encoders are used to encode chunks of videos to generate encoded video chunks corresponding to each of multiple pre-encoded versions of a video. Each pre-encoded version of a video typically corresponds to a different combination of average bitrate and resolution or "bitrate-resolution pair" and is associated with a different average quality level. Storing encoded video chunks corresponding to multiple pre-encoded versions of a video increases the likelihood that the video can be streamed with good quality over a network connection to an end-user device without playback interruptions, irrespective of the achievable throughput of the network connection.

In some embodiments, the encoded video chunks are stored on a origin server device and can be streamed to end-user devices on-demand via a CDN. In many implementations, to playback a given video, an end-user device executes a playback application that transmits a sequence of requests for encoded video chunks associated with the given video to an edge server device that is included in the CDN and resides closer to the end-user device than the origin server device. For each such request, if the edge server device has a copy of the requested encoded video chunk stored in an associated cache memory, then a cache hit occurs, and the edge server device transmits the requested encoded video chunk to the playback application. Otherwise, a cache miss occurs, and the edge server device retrieves the requested encoded video chunk from the origin server device, optionally stores the requested encoded video chunk in the associated cache memory, and transmits the requested encoded video chunk to the playback application. As the various encoded video chunks are received by the playback application, a video decoder decodes the encoded video chunks to generate corresponding decoded video chunks that are then played back via the end-user device.

One drawback of using conventional encoders to encode chunks of localized videos is that any original video data replicated in the chunks of a localized video is typically redundantly re-encoded. More specifically, to generate encoded video chunks associated with a given bitrate-resolution pair, original video data that is retained in associated localized videos is encoded once for the original video and re-encoded for each of the associated localized videos. As a result, the size of each conventional pre-encoded version of a localized video is comparable to the size of a corresponding pre-encoded version of an original video and, accordingly, is disproportionately large relative to the amount of localized video data present in the pre-encoded version of the localized video. Consequently, the amount of memory used to store all the encoded video chunks for each localized video is needlessly high.

For example, if an original video and thirty localized videos derived from the original video were each encoded for ten different bitrate-resolution pairs, then any original video data included in the localized videos would be redundantly re-encoded three hundred times. And the amount of memory used to store all of the encoded video chunks associated with the thirty localized videos would be on the order of thirty times the amount of memory used to store all the encoded video chunks associated with the original video.

Further, because the sizes of the cache memories used in edge server devices are usually substantially smaller than the total size of all of the encoded video chunks associated with a library of videos that are stored on an origin server device, the cache efficiency of a CDN oftentimes is decreased disproportionately relative to the amount of localized video data present in an encoded localized video. Any decrease in the cache efficiency of a CDN can lead to increased transmission delays, decreased effective transmission rates, and decreased transmission reliability when streaming videos and therefore can reduce the QoE for end-users.

To reduce the amount of original video data that is re-encoded when encoding localized videos, in some implementations, any localized video chunk that is identical to an original video chunk is simply not re-encoded. Instead, metadata is used to indicate that the corresponding encoded original video chunk is to be reused as the encoded localized video chunk. Any localized video chunk that is not identical to an original video chunk is encoded to generate a corresponding encoded localized video chunk. One drawback of this approach, though, is that oftentimes many of the chunks of a localized video have only minor differences relative to the corresponding chunks of an original video. In such instances, a relatively large amount of original video data ends up being re-encoded when encoding the chunks of localized video.

For example, when chunks of localized video corresponding to between two and ten seconds of playback time are generated using lip-reanimation techniques, almost all of the chunks of localized video end-up having only small modifications to the lips of speakers in at least one frame relative to the corresponding chunks of the original video. The rest of the data in the chunks of localized video, outside of the lip modifications, is usually identical to the data in the chunks of original video. Thus, when the chunks of localized video are encoded, a large percentage of the original video data is still re-encoded as well.

With the disclosed techniques, however, a localized video encoding application reuses portions of frames of an encoded version of an original video when encoding a localized video derived from the original video to generate an encoded localization layer instead of an encoded version of the localized video. In some embodiments, the localized video encoding application decodes the encoded version of the original video to generate a decoded original video. The localized video encoding application uses the decoded original video as a baseline for generating the encoded localization layer. The localized video encoding application compares each frame of the localized video to the corresponding frame of the decoded original video.

If the localized video encoding application determines that a given frame of the localized video does not differ perceptibly from the corresponding frame of the decoded original video, then the localized video encoding application indicates, via the encoded localization layer, that the frame of the encoded version of the original video is to be reused without any modifications as the corresponding frame of an encoded version of the localized video. Accordingly, the encoded localization layer indirectly indicates that the corresponding frame of the decoded original video is to be reused without any modifications as the corresponding frame of a decoded localized video.

If, however, the localized video encoding application determines that a given frame of the localized video differs perceptibly from the corresponding frame of the decoded original video, then the localized video encoding application partitions the frame of the localized video in localized portions and the corresponding frame of the decoded original video into original portions. For each localized portion, if the localized video encoding application determines that one of the original portions is a "best matched portion," then the localized video encoding application reuses the original portion at a position within a prediction frame that corresponds to the position of the localized portion within the frame of the localized video. The localized video encoding application subtracts the prediction frame from the frame of the localized video to generate a residual frame that represents a prediction error. The localized video encoding application encodes instructions for reconstructing the prediction frame and encodes the residual frame to generate an encoded localization layer frame corresponding to the frame of the localized video. The localized video encoding application then adds the encoded localization layer frame to the encoded localization layer.

In some embodiments, encoded video chunks for the original video and chunks of the encoded localization layer or "encoded localization layer chunks" for the localized video are stored on an origin device server. In the same or other embodiments, to stream the localized video to an end-user device, a video delivery application executing on the origin server device or an edge server device CDN delivers a sequence of encoded video chunks for the original video via one stream and a sequence of encoded localization layer chunks for the localized video via another stream to a playback application executing on the end-user device. The playback application generates a sequence of encoded video chunks for the localized video based on the sequence of video chunks for the original video and the sequence of encoded localization layer chunks for the localized video. As the playback application generates the various encoded video chunks for the localized video, a video decoder decodes the encoded video chunks to generate corresponding decoded video chunks for the localized video that are then played back via the end-user device.

At least one technical advantage of the disclosed techniques relative to the prior art is that the amount of original video data that the localized video encoding application re-encodes when encoding a localized video can be reduced. In that regard, because each frame of an encoded localization layer can specify the reuse of any number of portions (including all) of a corresponding frame of decoded original video, the size of the encoded localization layer can be substantially reduced relative to the size of an encoded version the localized video. Accordingly, storing encoded localization layer chunks instead of encoded localized video chunks in order to stream localized videos via a CDN can substantially reduce the total amount of memory used to store encoded representations of a library of videos on an origin server device. Another advantage of the disclosed techniques relative to prior art techniques is that because the total amount of memory used to store encoded representations of a library of video on an origin server device is decreased, the cache efficiency of a CDN can be increased and therefore the QoE for end-users can be increased. These technical advantages provide one or more technical advancements over prior art approaches.

System Overview

FIG. 1 is a conceptual illustration of a system 100 configured to implement one or more aspects of the various embodiments. As shown, in some embodiments, the system 100 includes, without limitation, a compute instance 110 (1)—a compute instance 110(4), a display device 102, and cloud-based video services 104. For explanatory purposes, the compute instance 110(1)—the compute instance 110(4) are also referred to herein individually as a "compute instance 110" and collectively as "compute instances 110." In some embodiments, the system 100 can include, without limitation, any number of compute instances 110, any number of display devices, any number and/or types of cloud-based services, or any combination thereof. In the same or other embodiments, the display device 102 and/or the cloud-based video services 104 are omitted from the system 100.

Any number of the components of the system 100 can be distributed across multiple geographic locations or implemented in one or more cloud computing environments (i.e., encapsulated shared resources, software, data, etc.) in any combination. In some embodiments, any number of compute instances 110 can be implemented in a cloud computing environment, implemented as part of any other distributed computing environment, or implemented in a stand-alone fashion.

As shown, in some embodiments, the compute instance 110(1) includes, without limitation, a processor 112(1) and a memory 116(1). In the same or other embodiments, the compute instance 110(2) includes, without limitation, a processor 112(2) and a memory 116(2). For explanatory purposes, the processor 112(1) and the processor 112(2) are also referred to herein individually as a "processor 112" and collectively as "processors 112." The memory 116(1) and the memory 116(2) are also referred to herein individually as a "memory 116" and collectively as "memories 116." Although not shown, each of the compute instance 110(3) and the compute instance 110(4) can include, without limitation, any number of processors and any number of memories.

Each processor 112 can be any instruction execution system, apparatus, or device capable of executing instructions. For example, each processor 112 could comprise a central processing unit, a graphics processing unit, a controller, a microcontroller, a state machine, or any combination thereof. The memory 116 of each compute instance 110 stores content, such as software applications and data, for use by the processor 112 of the compute instance 110. In some embodiments, each compute instance 110 can include any number of processors 112 and any number of memories 116 in any combination. In particular, any number of compute instances 110 (including one) can provide any number of multiprocessing environments in any technically feasible fashion.

Each memory 116 can be one or more of any readily available memory, such as random access memory, read-only memory, floppy disk, hard disk, or any other form of digital storage, local or remote. In some embodiments, a storage (not shown) may supplement or replace any number of memories 116. The storage can include any number and/or types of external memories that are accessible to any number of processors 112. For example, and without limitation, the storage can include a Secure Digital Card, an external Flash memory, a portable compact disc read-only memory, an optical storage device, a magnetic storage device, or any suitable combination of the foregoing.

As depicted in italics, in some embodiments, the compute instance 110(3) is an origin server device included in a set of one or more origin server devices (not shown). In some embodiments, the set of origin server devices collectively stores at least one copy of each of any number of pre-encoded versions of each video in a library of videos for streaming to end-user devices either directly or via one or more CDNs. In the same or other embodiments, each origin server device included in the set of origin server devices stores chunks of one or more pre-encoded versions of each video in any portion of a library of videos. In some embodiments, each origin server device can be included in any number (including zero) of CDNs.

Each video can include, without limitation, any amount and/or types of video data. Some examples of videos are feature-length films, episodes of television programs, music videos, and podcasts. In some embodiments, each pre-encoded version of a video typically corresponds to a different combination of average bitrate and resolution or "bitrate-resolution pair" and is associated with a different average quality level. A set of distinct bitrate-resolution pairs for a video is referred to herein as an "encode rate ladder" for the video. Having multiple pre-encoded versions of a video available increases the likelihood that the video can be streamed at good quality over a network connection to an end-user device without playback interruptions, irrespective of the achievable throughput of the network connection. "Lower-quality" encodings usually are streamed to an end-user device when the achievable throughput of the network connection is relatively low, and "higher-quality" encodings usually are streamed to the end-user device when the achievable throughput of the network connection is relatively high. In some embodiments, each pre-encoded version of a video is also referred to herein as an "encoded video."

In some embodiments, a video includes, without limitation, any number of discrete portions of video data referred to herein as "chunks of the video" and "video chunks." In the same or other embodiments, an encoded video includes, without limitation, any number of discrete portions of encoded video data referred to herein as "chunks of the encoded video" and "encoded video chunks." In some embodiments, an encoded version of a video includes, without limitation, a different encoded video chunk for each video chunk of the video.

As depicted in italics, in some embodiments, the compute instance 110(4) is one of multiple CDN edge server devices in a CDN that can retrieve encoded video chunks from one or more origin server devices and receive and respond to requests for encoded video chunks from end-user devices. In the same or other embodiments, each CDN edge server device receives and responds to requests from end-user devices that are closer to the CDN edge server device than to the origin server device. As described previously herein, in some embodiments, each CDN edge server device can temporarily store copies of a limited number of encoded video chunks in an associated cache memory. In some embodiments, the CDN includes, without limitation, any number of other cache memories that are distributed at intermediate locations throughout the CDN.

In some embodiments, in response to a request for an encoded video chunk that is received from an end-user device, a CDN edge server device locates and transmits a nearest copy of the encoded video chunk to the end-user device. In some embodiments, if the CDN edge server device has a copy of the requested encoded video chunk stored in the associated cache memory, then a "cache hit" occurs and the CDN edge server device transmits the copy of the requested encoded video chunk. In the same or other embodiments, if the requested encoded video chunk is not stored in the associated cache memory, then, a "cache miss" occurs. When a cache miss occurs, the CDN server device has to retrieve the requested encoded video chunk from an intermediate cache memory or the origin server device before transmitting the requested encoded video chunk to the end-user device.

As depicted in italics, in some embodiments, the compute instance 110(2) is an end-user device. In some embodiments, the compute instance 110(4) can stream videos via a network connection (not shown) to the compute instance 110(2). In the same or other embodiments, the compute instance 110(2) can display videos via the display device 102. In some embodiments, the display device 102 can be any type of device that can be configured to display any amount and/or type of video data in any technically feasible fashion. In the same or other embodiments, the compute instance 110(2), zero or more other compute instances 110, the display device 102, and zero or more other display devices are integrated into a user device (not shown). Some examples of user devices include, without limitation, desktop computers, laptops, smartphones, smart televisions, game consoles, tablets, etc.

In some embodiments, the cloud-based video services 104 includes, without limitation, microservices, databases, and storage for activities and content associated with the streaming video service that are allocated to none of the origin server device(s), the CDN, and the end-user devices. Some examples of functionality that the cloud-based video services 104 can provide include, without limitation, login and billing, logging, personalized video title recommendations, video transcoding, server and connection health monitoring, and client-specific CDN guidance. In some embodiments, the cloud-based video services 104 monitors the health of the compute instance 110(4) and the compute instance 110(2) and associated network connections.

Each compute instance 110 is configured to implement one or more software applications. For explanatory purposes only, each software application is depicted as residing in the memory 116 of a single compute instance 110 and executing on a processor 112 of the single compute instance 110. However, as persons skilled in the art will recognize, the functionality of each software application can be distributed across any number of other software applications that reside in the memories 116 of any number of compute instances 110 and execute on the processors 112 of any number of compute instances 110 in any combination. Further, the functionality of any number of software applications can be consolidated into a single application or subsystem.

In particular, in some embodiments, the compute instance 110(1) is configured to encode original videos and localized videos that are derived from the original videos via video localization. In video localization, one or more copies of an original video are modified to generate one or more localized videos that each conforms more to a different target audience. Usually, most of the video data included in a localized video is original video data that is unchanged from the corresponding original video, and the remaining video data is localized video data that is more customized for the associated target audience. As referred to herein, a "target audience" for a localized video includes, without limitation, end-users that are expected to select the localized video based on any number and/or types of criteria. For example, the target audience associated with a localized video that is modified to align with dubbing in a given language includes, without limitation, end-users that are expected to select the language from available languages. As described in greater detail previously herein, a typical video streaming service does not distinguish between localized videos and original videos when streaming videos to end-user devices. In particular, conventional encoders are used to encode chunks of localized videos to generate encoded video chunks for the localized videos.

One drawback of using conventional encoders to encode chunks of localized videos is that any original video data replicated in the chunks of a localized video is typically encoded once when generating encoded video chunks for the original video and again when generating encoded video chunks for the localized video. As a result, the total size of a conventional encoded localized video is comparable to the size of a corresponding encoded original video and, accordingly, is disproportionately large relative to the amount of localized video data present in the encoded localized video. Consequently, the amount of memory used to store the encoded video chunks for a localized video is needlessly high. Further, because the sizes of the cache memories used in edge server devices are usually substantially smaller than the total size of all of the encoded video chunks associated with a library of videos that are stored on an origin server device and available for streaming, the cache efficiency of a CDN and, in turn, the QoE for end-users is decreased disproportionately to the amount of localized video data present in an encoded localized video.

To reduce the amount of original video data that is re-encoded when encoding localized videos, in some implementations, any localized video chunk that is identical to an original video chunk is simply not encoded. Instead, metadata is used to indicate that the corresponding encoded original video chunk is to be reused as the encoded localized video chunk. One drawback of this approach, though, is that oftentimes many of the chunks of a localized video have only minor differences relative to the corresponding chunks of an original video. In such instances, when the chunks of localized video are encoded, a large percentage of the original video data is still re-encoded as well.

Encoding Differences Between Localized Videos and Original Videos

To address the above problems, in some embodiments, the compute instance 110(1) includes, without limitation, a localized video encoding application 120. As described in greater detail below, in some embodiments, instead of encoding the video data in a localized video, the localized video encoding application 120 encodes differences between the video data in a localized video and the video data in a corresponding decoded original video to generate an encoded localization layer. The encoded localization layer can subsequently be decoded in conjunction with an encoded original video to generate a decoded localized video. In some embodiments, each encoded chunk included in an encoded localization layer can be decoded in conjunction with a corresponding encoded chunk included in an encoded original video to generate a corresponding video chunk included in a decoded localized video.

For explanatory purposes, video chunks included in an original video and a localized video are also referred to herein as "original video chunks" and "localized video chunks," respectively. Encoded video chunks included in an encoded original video, an encoded localization layer, and an encoded localized video are also referred to herein as "encoded original video chunks," "encoded localization layer chunks," and "encoded localized video chunks," respectively. Video chunks included in a decoded original video and a decoded localized video are also referred to herein as "decoded original video chunks" and "decoded localized video chunks," respectively.

As described in greater detail below, in some embodiments, the compute instance 110(2) includes, without limitation, a playback application 170. In some embodiments, the playback application 170 constructs encoded localized video chunks based on encoded localization layer chunks and encoded original video chunks. The playback application 170 then decodes the encoded localized video chunks to generate decoded localized video chunks. In some embodiments, the playback application 170 sequentially displays the decoded localized video chunks via the display device 102 to playback a corresponding localized video.

Advantageously, the amount of original video data that the localized video encoding application 120 re-encodes when encoding a localized video can be substantially reduced relative to the amount of original video data that a conventional encoder would re-encode when encoding the localized video. As a result, the encoded localization layer for a localized video can be significantly smaller than an encoded version of the localized video. Furthermore, if multiple localized videos are derived from the same original video, then the corresponding encoded localization layers can be decoded in conjunction with the same encoded original video. Consequently, the amount of memory that an origin server device uses to store encoded video data for each additional localized video can be reduced from the size of a corresponding encoded version of the localized video to the size of the corresponding encoded localization layer. As a result, the cache efficiency of an associated CDN and, in turn, the QoE for end-users can be increased.

As shown, in some embodiments, the localized video encoding application 120 resides in the memory 116(1) of the compute instance 110(1) and executes on the processor 112(1) of the compute instance 110(1). In the same or other embodiments, the playback application 170 resides in the memory 116(2) of the compute instance 110(2) and executes on the processor 112(2) of the compute instance 110(2). In some other embodiments, any number of portions (including all) of the functionality described herein with respect to the localized video encoding application 120 and the playback application 170 can be distributed across any number of compute instances in any technically feasible fashion. In some embodiments, the playback application 170 can be omitted from the system 100.

For explanatory purposes, the functionality of the localized video encoding application 120 in some embodiments is described in the context of generating a single encoded version of an original video 122 and a different encoded localization layer for each of a localized video 124(1)—a localized video 124(K), where K can be any positive integer. In the same or other embodiments, the localized video encoding application 120 uses the same set of encoding parameter values to encode the original video 122 and the localized video 124(1)—the localized video 124(K).

As persons skilled in the art will recognize, however, the techniques described herein in conjunction with the localized video encoding application 120 and the playback application 170 are illustrative rather than restrictive and can be altered without departing from the broader spirit and scope of the invention. Many modifications and variations on the functionality of the localized video encoding application 120 and the playback application 170 as described herein will be apparent to those of ordinary skill in the art without departing from the scope and spirit of the described embodiments. For instance, in some embodiments, the localized video encoding application 120 can generate J encoded versions of the original video 122 and J encoded localization layers for each of the localized video 124(1)—the localized video 124(K) based on J sets of encoding parameter values, where J is an integer greater than one.

As shown, in some embodiments, the localized video encoding application 120 generates an encoded original video 132 and an encoded localization layer 150(1)—an encoded localization layer 150(K) based on the original video 122 and the localized video 124(1)—the localized video 124(K). For explanatory purposes, the localized video 124(1)—the localized video 124(K) are also referred to herein individually as a "localized video 124" and collectively as "localized videos 124" and "localized videos 124(1)-124(K)." The encoded localization layer 150(1)—the encoded localization layer 150(K) are also referred to herein individually as an "encoded localization layer 150" and collectively as "encoded localization layers 150" and "encoded localization layers 150(1)-150(K)."

As shown, in some embodiments, the localized video encoding application 120 includes, without limitation, a video encoder 130, the encoded original video 132, a localization encoder 140(1)—a localization encoder 140(K), and the encoded localization layers 150. The localization encoder 140(1)—the localization encoder 140(K) are different instances of a single localization encoder that is also referred to herein as a "localization encoder 140." For explanatory purposes, the localization encoder 140(1)—the localization encoder 140(K) are also referred to herein individually as the "localization encoder 140" and collectively as "localization encoders 140" and "localization encoders 140(1)-140(K)."

As shown, in some embodiments, the video encoder 130 encodes the original video 122 to generate the encoded original video 132. Accordingly, the encoded original video 132 is an encoded version of the original video 122. For an integer k from 1 to K, the localization encoder 140(k) generates the encoded localization layer 150(k) based on the localized video 124(k) and the encoded original video 132. As described in greater detail below in conjunction with FIG. 2, in some embodiments, the localization encoder 140(k) can optionally acquire and use any amount and/or types of additional data to identify localized video data. For instance, in some embodiments, the localized video encoding application 120 inputs the original video 122 and/or metadata generated by a localization application when generating the localized video 124(k) into the localization encoder 140(k).

The localization encoder 140 can implement any number and/or types of encoding techniques and any number and/or types of decoding techniques to generate the encoded localization layer 150. In some embodiments, the localization encoder 140 implements scalable encoding techniques to generate the encoded localization layer 150. In scalable encoding, a modified version of an original video frame can be encoded in the form of a difference between the original video frame and the modified video frame. Some examples of coder/decoders (codecs) that implement scalable encoding techniques for different encoded versions of a single video include, without limitation, AOMedia Video 1 (AV1) codecs, some H.245/High Efficiency Video Coding (HEVC) codecs, and some H.264/Advanced Video Coding (AVC) codecs. By contrast, the localization encoder 140 implements scalable encoding techniques for encoded versions of different but related videos.

For explanatory purposes, the functionality of the localization encoder 140 in some embodiments is described below in the context of the localization encoder 140(1). As described in greater detail below in conjunction with FIG. 2, in some embodiments, the localization encoder 140(1) decodes the encoded original video 132 to generate a decoded original video (not shown in FIG. 1). The localization encoder 140(1) uses the frames of the decoded original video as a baseline for generating the frames of the encoded localization layer 150(1) in accordance with the frames of the localized video 124(1). In the same or other embodiments, each frame of the encoded localization layer 150(1) specifies, without limitation, encoded prediction metadata and optionally encoded residual data. In some embodiments, the encoded prediction metadata instructs a video decoder to copy to and optionally move relative to a reconstructed prediction frame, one or more portions of a corresponding frame of the decoded original video. In the same or other embodiments, the encoded residual data specifies modifications that the video decoder is to make to the reconstructed prediction frame to generate a frame of a decoded localized video. In some embodiments, the decoded localized video is an inexact replica of the localized video 124(1).

Although not shown, in some embodiments, any software application can generate any portion of an encoded version of a localized video based on a corresponding portion of a corresponding encoded original video and a corresponding portion of a corresponding encoded localization layer. For explanatory purposes, generating a portion of an encoded version of a localized video is described herein in the context of generating a chunk of an encoded version of the localized video 124(1) or "encoded localized video chunk." The same techniques can be applied to generate any portion of any encoded localized video based on a corresponding portion of an encoded original video and a corresponding portion of an encoded localization layer.

Although not shown, in some embodiments, the localization encoder 140, the localized video encoding application 120, the playback application 170, any other software application, or any hardware module can execute a "layer interleaving algorithm" to generate any portion (including all) of an encoded localized video. In the same or other embodiments, the layer interleaving algorithm specifies, without limitation. a series of instructions to generate any portion of an encoded localized video based on a corresponding portion of a corresponding encoded original video, a corresponding portion of a corresponding encoded localization layer, and optionally any amount and/or types of metadata.

In some embodiments, a software application or hardware module executes a layer interleaving algorithm to generate an encoded localized video chunk based on an encoded original video chunk associated with an original video chunk and an encoded localization layer chunk associated with a localized video chunk. In the same or other embodiments, the disclosed techniques can be used to generate any number of portions (including one) of an encoded localized video for any localized video based on corresponding portions of an encoded original video and corresponding portions of an encoded localization layer.

In some embodiments, to generate the encoded localized video chunk, the software application or hardware module identifies each frame of the localized video chunk that differs from the corresponding frame of the original video chunk. The software application or the hardware module can determine whether a frame of the localized video chunk differs from a corresponding frame of the original video chunk in any technically feasible fashion. For instance, in some embodiments, the software application or the hardware module determines whether a frame of the localized video chunk differs from a corresponding frame of the original video chunk based on the corresponding frame of the encoded localization layer chunk, any amount and/or types of metadata, or any combination thereof.

In some embodiments, for each identified frame of the localized video chunk, the software application or the hardware module marks a corresponding frame of the encoded original video chunk as a reference-only frame to generate an encoded base layer. Accordingly, the frames included in the encoded base layer are selectively-marked copies of the frames included in the encoded original video chunk. As used herein, a "reference-only frame" is a frame that can be used as a reference for other frames but is neither displayed nor presented. The software application or hardware module then interleaves the frames of the encoded base layer with the frames of the encoded localization layer chunk to generate the encoded localized video chunk.

As shown, in some embodiments, the localized video encoding application 120 transmits the encoded original video 132 and each of the encoded localization layers 150 separately to any number of origin server devices (e.g., the compute instance 110(3)). In the same or other embodiments, any number of CDN edge server devices (e.g., the compute instance 110(4)) can stream the encoded original video 132 and each of the encoded localization layers 150 separately to any number of end-user devices (e.g. the compute instance 110(2)).

In some embodiments, to stream one of the localized videos 124 to an end-user device (e.g., the compute instance 110(2)), a CDN edge server device delivers two separate streams—an encoded original video stream and an encoded localization layer stream—to the end-user device. In some embodiments, the CDN edge server device delivers chunks of the encoded original video 132 via the encoded original video stream and chunks of the encoded localization layer 150 corresponding to the localized video 124 via the encoded localization layer stream.

Although not shown, in some other embodiments, one or two edge server devices, one or two origin server devices, one or two other devices, or any combination thereof, can deliver chunks of the encoded original video 132 and chunks of the encoded localization layer 150 corresponding to the localized video 124 to the end-user device via a single stream or two separate streams in any technically feasible fashion. In some embodiments, the encoded original video 132 is downloaded to the end-user device at some point-in-time before the encoded localization layer 150 is streamed to the end-user device, and the techniques described herein are modified accordingly.

For explanatory purposes, FIG. 1 depicts an example of high-level events that the playback application 170 executes to playback the localized video 124(1). In some embodiments, the playback application 170 opens one or more network connections to the cloud-based video services 104 that allow an end-user of the playback application 170 to select a video for streaming to the compute instance 110(2). In the same or other embodiments, the playback application 170 can transmit to and/or receive from the cloud-based video services 104 any amount (including none) and/or types of data in any technically feasible fashion.

In some embodiments, the end-user or the playback application 170 selects the localized video 124(1) for streaming in any technically feasible fashion. For instance, in some embodiments, the playback application 170 can select the localized video 124(1) for streaming based on any number and/or types of end-user defaults, any number and/or types of end-user preferences, the language the end-user selected for playback of a previously selected localized video, or any combination thereof. In some embodiments, after the end-user or the playback application 170 selects the localized video 124(1) for streaming, the playback application 170 sends a manifest request specifying the localized video 124(1) to the cloud-based video services 104. In response, the cloud-based video services 104 provides a manifest file 172 based on the localized video 124(1), optionally the CDN, and optionally the computer instance 110(2). The cloud-based video services 104 then transmits the manifest file 172 to the playback application 170.

In some embodiments, the manifest file 172 specifies, without limitation, a bitrate-resolution pair, an average quality level, and location data associated with the encoded version of the localized video 124(1). In the same or other embodiments, the location data specifies, without limitation, the locations of encoded original video chunks for the original video 122 and the locations of encoded localization layer chunks for the localized video 124(1) on each of one or more CDN edge server devices that are proximate to the compute instance 110(2). As described previously herein, the encoded original video chunks for the original video 122 are chunks of the encoded original video 132. The encoded localization layer chunks for the localized video 124(1) are chunks of the encoded localization layer 150(1). The one or more CDN edge server devices that are proximate to the compute instance 110(2) include, without limitation, the compute instance 110(4).

In some embodiments, the playback application 170 selects, based on the manifest file 172, a sequence of encoded original video chunks and a corresponding sequence of encoded localization layer chunks for transmission from the compute instance 110(4) to the compute instance 110(2). The selected sequence of encoded original video chunks and the selected sequence of encoded localization layer chunks correspond to a display order for the video chunks (and the frames within the video chunks) of the original video 122 and the localized video 124(1), respectively.

For explanatory purposes, FIG. 1 depicts a exemplary period of time that begins when, in some embodiments, the playback application 170 selects the location of an encoded original video chunk 186 as per the selected sequence of encoded original video chunks and the location of an encoded localization layer chunk 188 as per the selected sequence of encoded localization layer chunks. The encoded original video chunk 186 and the encoded localization layer chunk 188 correspond to the same localized video chunk.

As shown, the playback application 170 issues an encoded video chunk request 182 and an encoded layer chunk request 184 to a video delivery application (not shown) executing on the compute instance 110(4). In some embodiments, the encoded video chunk request 182 targets bytes corresponding to the encoded original video chunk 186. In the same or other embodiments, the encoded layer chunk request 184 targets bytes corresponding to the encoded localization layer chunk 188.

In response to the encoded video chunk request 182 and the encoded layer chunk request 184, in some embodiments, the video delivery application retrieves and transmits the encoded original video chunk 186 and the encoded localization layer chunk 188 via separate streams. In some other embodiments, the video delivery application provides the encoded original video chunk 186 and the encoded localization layer chunk 188 within a single stream (not shown) in any technically feasible fashion. As the playback application 170 incrementally receives the encoded original video chunk 186 and the encoded localization layer chunk 188, the playback application 170 incrementally stores the encoded original video chunk 186 and the encoded localization layer chunk 188 in a playback buffer 174.

In some embodiments, as frames of the encoded original video chunk 186 and frames of the encoded localization layer chunk 188 are received by the playback application 170 and/or stored in the playback buffer 174, the playback application 170 incrementally executes the layer interleaving algorithm described previously herein to incrementally construct an encoded localized video chunk 176. In the same or other embodiments, the playback application 170 incrementally uses a multi-layer video decoder 178 to incrementally decode the encoded localized video chunk 176, thereby incrementally generating a decoded localized video chunk 190.

The multi-layer video decoder 178 can include, without limitation, zero or more software applications, zero or more hardware modules, or any combination thereof that, together, can decode the encoded localized video chunk 176 to generate the decoded localized video chunk 190. In some embodiments, the multi-layer video decoder 178 implements scalable decoding techniques and/or any number and/or types of other decoding techniques to decode multiple, related layers of encoded video data that are represented in any technically feasible fashion. For instance, in some embodiments, the multi-layer video decoder 178 supports the Scalable Video Coding (SVC) extension of the H.264/AVC.

In some embodiments, the playback application 170 incrementally renders the decoded localized video chunk 190 and zero or more other decoded localized video chunks (not shown) to the display device 102 in the display order associated with the localized video 124(1), thereby playing back the localized video 124(1) chunk-by-chunk. In the same or other embodiments, the playback application 170 can incrementally render and playback frames in a partially generated version of the decoded localized video chunk 190 before all frames of the encoded original video chunk 186 and/or all frames of the encoded localization layer chunk 188 are received by the playback application 170.

Note that the techniques described herein are illustrative rather than restrictive and can be altered without departing from the broader spirit and scope of the invention. Many modifications and variations on the functionality of the localized video encoding application 120, the localization encoder 140, and the playback application 170 as described herein will be apparent to those of ordinary skill in the art without departing from the scope and spirit of the described embodiments. Similarly, many modifications and variations on the storage and delivery of encoded original videos, encoded localization layers, and encoded localized videos as described herein will be apparent to those of ordinary skill in the art without departing from the scope and spirit of the described embodiments.

For instance, in some embodiments, the original video 122 includes, without limitation, any amount of baseline video data that is not intended to be presented directly to end-users. Instead, the original video 122 is used to generate localized videos 124 and the encoded original video 132 is decoded and used to generate the encoded localization layers 150. Notably, the encoded original video 132 and the encoded localization layers 150 are not independently decoded for presentation but are used to generate at least portions of localized encoded videos (e.g., the encoded localized video chunk 176) that are decoded for presentation.

In particular, in some embodiments, the original video 122 is a version of an original-language video in which lips are blurred out and one of the localized videos 124 is set equal to the original-language video. In the same or other embodiments, each of the encoded localization layers 150 (including the encoded localization layer 150 corresponding to the original-language video) codes for adding corresponding language lip appearance data to the original video 122 but does not need to code for removing original language lip appearance data from the original video 122, Accordingly, relative to embodiments in which an original video is the original-language video, the number of pixel differences can be reduced.

In some embodiments, the original video 122 is a version of an original-language video that depicts, without limitation, empty text message bubbles, and one of the localized videos 150 is set equal to the original-language video. In the same or other embodiments, each of the encoded localization layers 150 (including the encoded localization layer 150 corresponding to the original-language video) codes for adding corresponding language text to the text bubbles but does not need to code for removing original language text from the original video 122, Accordingly, relative to embodiments in which an original video is the original-language video, the number of pixel differences can be reduced.

It will be appreciated that the system 100 shown herein is illustrative and that variations and modifications are possible. For example, the functionality provided by the localized video encoding application 120, the localization encoder 140, the playback application 170, and the cloud-based video services 104 described herein can be integrated into or distributed across any number of software applications (including one), and any number of components of the system 100. Further, the connection topology between the various units in FIG. 1 can be modified as desired.

Figure 2:
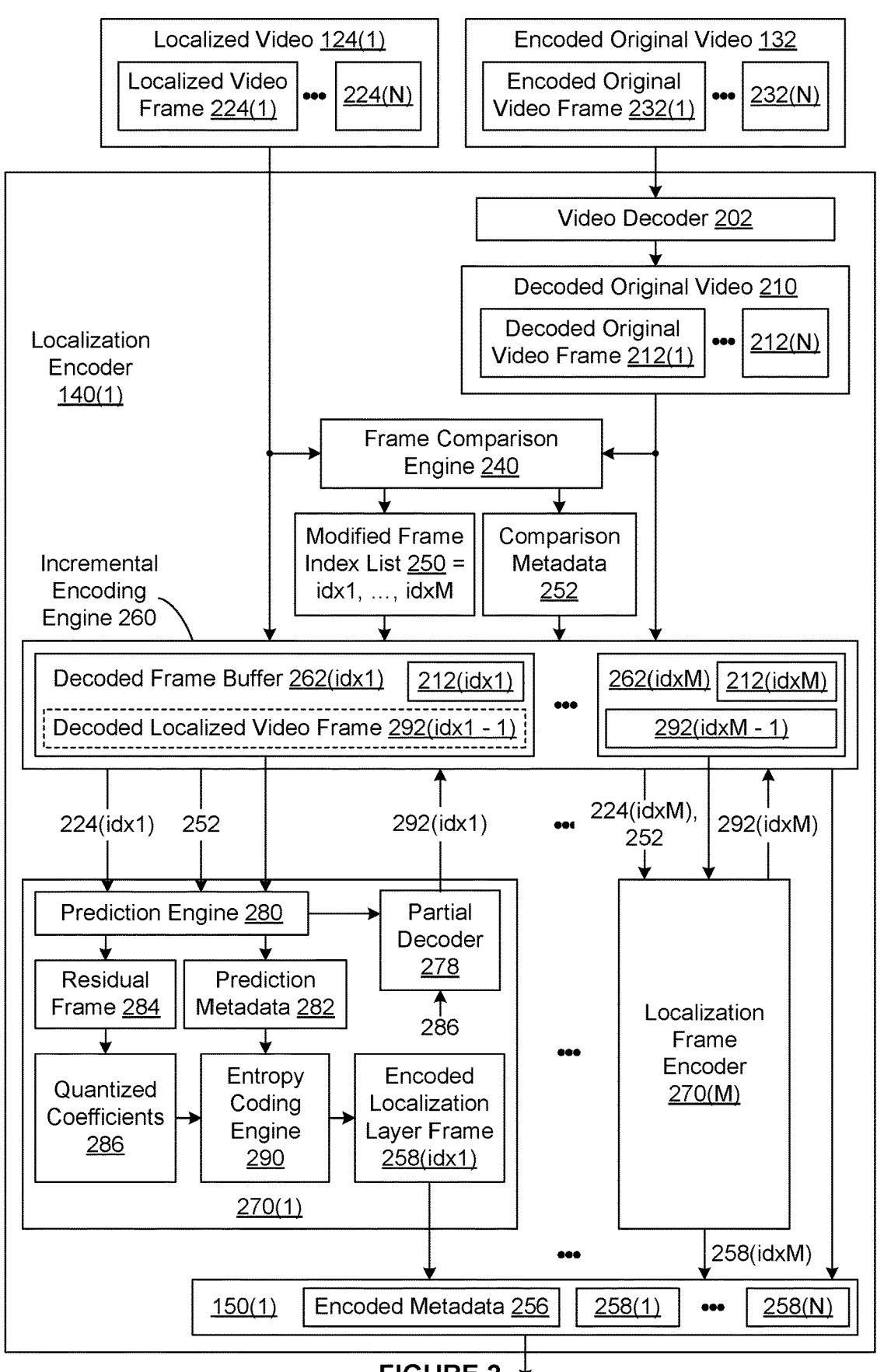
FIG. 2 is a more detailed illustration of one of the localization encoders of FIG. 1, according to various embodiments.

FIG. 2 is a more detailed illustration of one of the localization encoders 140 of FIG. 1, according to various embodiments. More precisely, FIG. 2 depicts the localization encoder 140(1) that, in some embodiments, generates the encoded localization layer 150(1) based on the localized video 124(1) and the encoded original video 132. As described previously herein in conjunction with FIG. 1, the localized video 124(1) is a modified version of the original video 122. The localized video 124(1) can be derived from the original video 122 in any technically feasible fashion.

Although not shown, in some embodiments, the original video 122 includes, without limitation, a sequence of N frames, where N can be any positive integer. For explanatory purposes, the frames of the original video 122 are also referred to herein individually as an "original video frame" and collectively as "original video frames." Each original video frame is an image that includes, without limitation, any amount and/or types of video data. Video data included in an original video frame is also referred to herein as "original video data." For explanatory purposes, the original video frames are associated with frame indices. The frame indices range from 1 through N in accordance with a display order in which the frames are sequentially displayed during playback. More precisely, during a typical playback of the original video 122, the original video frames corresponding to the frame indices 1 through N are sequentially displayed.

As shown, in some embodiments, the localized video 124(1) includes, without limitation, a sequence of a localized video frame 224(1)—a localized video frame 224(N), where N is the total number of original video frames. In the same or other embodiments, the localized video frame 224(1)—the localized video frame 224(N) are modified versions of and therefore correspond to the original video frame having the frame index of 1 through the original video frame having the frame index of N, respectively. For explanatory purposes, the localized video frame 224(1)—the localized video frame 224(N) are associated with frame indices of 1-N, respectively. In some embodiments, the number of frames in the localized video 124(1) can differ from the number of original video frames, and the techniques described herein are modified accordingly.

For explanatory purposes, the localized video frame 224(1)—the localized video frame 224(N) are also referred to herein individually as a "localized video frame 224" and collectively as "localized video frames 224" and "localized video frames 224(1)-224(N)." In some embodiments, each localized video frame 224 is a frame of the localized video 124(1) that includes, without limitation, any amount of original video data that matches the original video data in the corresponding original video frame and/or any amount of localized video data that is modified relative to the original video data in the corresponding original video frame.

The encoded original video 132 is an encoded version of the original video 122. The encoded original video 132 can be generated in any technically feasible fashion. As described previously herein in conjunction with FIG. 1, in some embodiments, the video encoder 130 encodes the original video 122 to generate the encoded original video 132. As shown, in some embodiments, the encoded original video 132 includes, without limitation, an encoded original video frame 232(1)—an encoded original video frame 232(N).

The encoded original video frame 232(1)—the encoded original video frame 232(N) are encoded versions of and therefore correspond to the original video frame having the frame index of 1 through the original video frame having the frame index of N, respectively. For explanatory purposes, the encoded original video frame 232(1)—the encoded original video frame 232(N) are associated with frame indices of 1-N, respectively. The encoded original video frame 232(1)—the encoded original video frame 232(N) are also referred to herein individually as an "encoded original video frame 232" and collectively as "encoded original video frames 232" and "encoded original video frames 232(1)-232(N)."

As shown, in some embodiments, the localization encoder 140(1) includes, without limitation, a video decoder 202, a decoded original video 210, a frame comparison engine 240, a modified frame index list 250, comparison metadata 252, an incremental encoding engine 260, a localization frame encoder 270(1)—a localization frame encoder 270(M), and the encoded localization layer 150(1). In some embodiments, M can be any integer that is greater than or equal to one and less than or equal to N.

In some embodiments, the localization frame encoder 270(1)—the localization frame encoder 270(M) are different instances of a localization frame encoder, The localization frame encoder is also referred to herein as a "localization frame encoder 270." For explanatory purposes, the localization frame encoder 270(1)—the localization frame encoder 270(M) are also referred to herein individually as "localization frame encoder 270" and collectively as "localization frame encoders 270" and "localization frame encoders 270(1)-270(M)."

As shown, the video decoder 202 decodes the encoded original video 132 to generate the decoded original video 210. The video decoder 202 can be any video decoder or any portion of a codec that is capable of decoding the encoded original video 132. In some embodiments, the video decoder 202 implements any number and/or types of decoding techniques to decode a single layer of encoded video data. In the same or other embodiments, the video decoder 202 implements any number and/or types of decoding techniques to decode multiple layers of encoded video data that are represented in any technically feasible fashion. In some embodiments, the video decoder 202 is an instance of the multi-layer video decoder 178 of FIG. 1 or any other multi-layer video encoder. In the same or other embodiments, the video decoder 202 supports the SVC extension of the H.264/AVC.

As shown, the decoded original video 210 includes, without limitation, a decoded original video frame 212(1)—a decoded original video frame 212(N). The decoded original video frame 212(1)—the decoded original video frame 212(N) are decoded versions of the encoded original video frames 232(1)-232(N), respectively, and therefore correspond to the original video frame having the frame index of 1 through the original video frame having the frame index of N, respectively. For explanatory purposes, the decoded original video frame 212(1)—the decoded original video frame 212(N) are associated with frame indices of 1-N, respectively. The decoded original video frame 212(1)—the decoded original video frame 212(N) are also referred to herein individually as a "decoded original video frame 212" and collectively as "decoded original video frames 212" and "decoded original video frames 212(1)-212(N)."

As persons skilled in the art will recognize, because video encoders typically implement lossy compression techniques, decoded video data can include any amount and/or types of noise attributable to compression that can cause visually perceptible distortions known as "encoding artifacts" when displayed. Accordingly, in some embodiments, the decoded original video frames 212 are inexact replicas of the corresponding original video frames, and the decoded original video 210 is an inexact replica of the original video 122.

As shown, in some embodiments, the frame comparison engine 240 generates the modified frame index list 250 and the comparison metadata 252 based on the localized video 124(1) and the decoded original video 210. In some embodiments, the modified frame index list 250 specifies, without limitation, frame indices of a subset of the localized video frames 224(1)-224(N) that differ from the decoded original video frames 212(1)-212(N), respectively. In the same or other embodiments, the modified frame index list 250 specifies, without limitation, frame indices of a subset of the localized video frames 224(1)-224(N) that include visually perceptible modifications attributable to video localization. For explanatory purposes, in some embodiments, the modified frame index list 250 includes, without limitation, M frame indices denoted herein, in display order, as idx1-idxM, where 1<=idx1<=idxM<=M<=N.

In some embodiments, the comparison metadata 252 identifies, without limitation, any amount and/or types of original video data included in any portions (including all) of localized video frames 224(1)-224(N). In the same or other embodiments, the comparison metadata 252 identifies, without limitation, any number and/or types of differences between any portions (including all) of localized video frames 224(1)-224(N) and corresponding portions of decoded original video frames 212(1)-212(N), respectively. For instance, in some embodiments, the comparison metadata 252 specifies, without limitation, frame indices corresponding to the subset of the localized video frames 224 that do not include any localized video data and/or positions of one or more discrete portions of localized video data for each of any number of the subset of the localized video frames 224 that include localized video data.

The frame comparison engine 240 can determine any number and/or types of differences associated with the localized video frames 224 and/or detect localized video data in any technically feasible fashion. The frame comparison engine 240 can generate the modified frame index list 250, the comparison metadata 252, any amount and/or types of other comparison data, or any combination thereof, based on any number and/or types of differences associated with localized video frames 224 and/or localized video data in any technically feasible fashion.

In some embodiments, for a frame index x from 1 through N, the frame comparison engine 240 compares the localized video frame 224(*x*) to the decoded original video frame 212(*x*) to determine whether to add the frame index x to the modified frame index list 250. In the same or other embodiments, the frame comparison engine 240 computes per-pixel pixel value differences between the localized video frame 224(*x*) and the decoded original video frame 212(*x*) to determine a "modification" frame associated with the localized video frame 224(*x*). In some embodiments, the frame comparison engine 240 can implement any minimum difference criteria (e.g., minimum pixel value distance, minimum size of modification portions, etc.), and filter-out and/or disregard any differences that do not meet the minimum difference criteria.

In some embodiments, the frame comparison engine 240 can perform any number and/or types of operations in any technically feasible fashion and based on any amount and/or types of data to distinguish between differences that correspond to localized video data and differences that are attributable to noise and/or encoding artifacts. In the same or other embodiments, the frame comparison engine 240 can disregard or filter-out differences that are attributable to noise and/or encoding artifacts. In some embodiments, the frame comparison engine 240 can generate the modified frame index list 250, the comparison metadata 252, any amount and/or types of other output data, or any combination thereof based on differences that correspond to localized video data and therefore are attributable to video localization.

Although not shown, in some embodiments, the frame comparison engine 240 compares the localized video 124(1) to the original video 122 instead of the decoded original video 210 to determine differences that correspond to localized video data. In the same or other embodiments, the frame comparison engine 240 can use any amount and/or types of metadata to identify differences that correspond to localized video data. For instance, in some embodiments, a localization application that modifies the original video 122 to generate the localized video 124(1) also generates metadata that specifies each modified portion of each original video frame. In the same or other embodiments, in accordance with any amount and/or types of metadata, the frame comparison engine 240 filters-out or disregards any differences that do not correspond to the modified portions of original video frames.

As shown, in some embodiments, the incremental encoding engine 260 generates the encoded localization layer 150(1) based on the decoded original video 210, the localized video 124(1), the modified frame index list 250, and the comparison metadata 252. In some embodiments, the encoded localization layer 150(1) includes, without limitation, any amount (including none) and/or types of encoded metadata 256 and an encoded localization layer frame 258(1)—an encoded localization layer frame 258(N), where N is the total number of frames included in the localized video 124(1).

In some embodiments, the encoded metadata 256 can indicate that any number of decoded original video frames 212 are to be reused without modification as part of a decoded localized video (not shown). In the same or other embodiments, the encoded localization layer frame 258(1)—the encoded localization layer frame 258(N) are encoded versions of the localized video frames 224(1)-224(N), respectively. For explanatory purposes, the encoded localization layer frame 258(1)—encoded localization layer frame 258(N) are associated with frame indices of 1-N, respectively. The encoded localization layer frame 258(1)—encoded localization layer frame 258(N) are also referred to herein individually as an "encoded localization layer frame 258" and collectively as "encoded localization layer frames 258" and "encoded localization layer frames 258(1)-258(N)."

Although not shown, in some embodiments, each of the encoded localization layer frames 258 specifies, without limitation, any amount (including none) of encoded prediction metadata and any amount (including none) of encoded residual data. In some embodiments, the encoded prediction metadata included in the encoded localization frame $258(x)$, where x can be any integer from 1 through N, instructs a video decoder to copy to and optionally move relative to a reconstructed prediction frame, one or more portions of the decoded original video frame $212(x)$. In the same or other embodiments, the encoded residual data specifies modifications that the video decoder is to make to the reconstructed prediction frame to generate a decoded localized video frame having the frame index of x within a decoded localized video (not shown). In some embodiments, the decoded localized video frame having the frame index of x is an inexact replica of the localized video frame $224(x)$.

In some other embodiments, the encoded localization layer $150(1)$ can omit one or more of the encoded localization layer frames $258$, where each omission indicates that the corresponding frame of the decoded original video $210$ is to be reused without modification as a corresponding decoded localized video frame included in a decoded localized video. For instance, if the encoded localization layer $150(1)$ does not include any encoded localization layer frame $258$ having the frame index of x, then the encoded localization layer $150(1)$ implicitly instructs a video decoder to set the decoded localized video frame having the frame index of x equal to the decoded original video frame $212(x)$. The techniques described herein can be modified to reflect omissions of any number of encoded localization layer frames $258$.

As described in detail previously herein in conjunction with FIG. $1$, in some embodiments, the localization encoder $140$, the localized video encoding application $120$, the playback application $170$, any other software application, or any hardware module can execute a layer interleaving algorithm to generate any portion (including all) of an encoded localized video. In the same or other embodiments, the layer interleaving algorithm can be used to generate any portion of an encoded localized video based on a corresponding portion of the encoded original video $132$, a corresponding portion of the encoded localization layer $150(1)$, and optionally any amount and/or types of metadata. In some embodiments, any portion of an encoded localized video can be decoded to generate a corresponding portion of a decoded localized video.

In some embodiments, any portion of the encoded localization layer $150(1)$ can be used in conjunction with a corresponding portion of the decoded original video $210$ to generate a corresponding portion of a decoded localized video. In the same or other embodiments, any portion of the encoded localization layer $150(1)$ can be decoded in conjunction with a corresponding portion of the encoded original video $132$ to generate a corresponding portion of a decoded localized video.

In some embodiments, the incremental encoding engine $260$ sequentially encodes the localized video frames $224$ in accordance with an "encode/decode" order to incrementally generate the encoded localization layer $150(1)$. In the same or other embodiments, each of the encoded localization layer frames $258$ is a predicted frame (P-frame). In general, during encoding, if a prediction frame can be "backward predicted" using any portion of any decoded localized video frame or any decoded original video frame $212$ that occurs later in a display order, then the encode/decode order can be out-of-order with respect to the display order. In the same or other embodiments, zero or more of the encoded localization layer frame $258$ are intra-coded frames (I-frames), zero or more of the encoded localization layer frames $258$ are P-frames, and zero or more of the encoded localization layer frames $258$ are Bidirectional predicted frames (B-frames).

For explanatory purposes, the functionality of the incremental encoding engine $260$ is described herein in the context of some embodiments in which no prediction frames are backward predicted, and the encode/decode order matches the display order of the localized video $124(1)$. In some other embodiments, any number and/or types of portions of each prediction frame can be intra-predicted, forward predicted, backward predicted, or any combination thereof, the encode/decode order can vary from the display order, and the techniques described herein are modified accordingly.

In some embodiments, the incremental encoding engine $260$ can initialize the encoded localization layer $150(1)$ in any technically feasible fashion based on any amount and/or types of data. For instance, in some embodiments, the incremental encoding engine $260$ can specify any amount and/or types of encoded metadata $256$ that identify any number and/or types of characteristics of the localized video $124(1)$, any amount and/or types of encoding-related information, etc.

In the same or other embodiments, the incremental encoding engine $260$ sequentially encodes the localized video frames $224(1)$-$224(N)$ to sequentially generate the encoded localization layer frames $258(1)$-$258(N)$, respectively. For explanatory purposes, the functionality of the incremental encoding engine $260$ in some embodiments is described in the context of encoding the localized video frame $224(x)$, where x can be any integer from 1 through N.

In some embodiments, if the localized video frame $224(x)$ is not included in the modified frame index list $250$, then the incremental encoding engine $260$ indicates, via the encoded localization layer $150(1)$, that the decoded original video frame $212(x)$ is to be reused without any modifications as the decoded localized video frame having the frame index of x. The incremental encoding engine $260$ can make any number (including zero) of modifications to the encoded localization layer $150(1)$ to indicate that the decoded original video frame $212(x)$ is to be reused without any modifications.

In some embodiments, the incremental encoding engine $260$ generates encoded localization layer frame $258(x)$ specifying that the decoded original video frame $212(x)$ is to be reused without any modifications as the decoded localized video frame having the frame index of x, and then appends the encoded localization layer frame $258(x)$ to the encoded localization layer $150(1)$. The incremental encoding engine $260$ can specify reuse of the decoded original video frame $212(x)$ via the encoded localization layer frame $258(x)$ in any technically feasible fashion.

In some embodiments, to specify reuse of the decoded original video frame $212(x)$ via the encoded localization layer frame $258(x)$, the incremental encoding engine $260$ generates one or more "skip" instructions and/or any amount and/or types of skip metadata to indicate that the encoded localized video frame having the frame index x is equal to the encoded original video frame having the frame index of x. The incremental encoding engine $260$ then encodes the skip instructions and/or the skip metadata to generate encoded prediction metadata. The incremental encoding engine $260$ generates the encoded localization layer frame $258(x)$ that includes, without limitation, the encoded prediction metadata $256$.

In some embodiments, if the frame index x is not included in the modified frame index list $250$, then the incremental encoding engine $260$ does not generate any encoded localization layer frame $258$ having the frame index of x.

Consequently, the encoded localization layer 150(1) does not include any encoded localization layer frame having the frame index of x. In the same or other embodiments, omitting an encoded localization layer frame having the frame index x from the encoded localization layer 150(1) implicitly indicates that the decoded original video frame 212(*x*) is to be reused without any modifications as the decoded localized video frame having the frame index x.

As shown, in some embodiments, if the frame index x is included in the modified frame index list 250, then the incremental encoding engine 260 causes an instance of the localization frame encoder 270 to perform one or more encoding operations on the localized video frame 224(*x*) to generate the encoded localization layer frame 258(*x*). In the same or other embodiments, the incremental encoding engine 260 or the instance of the localization frame encoder 270 then appends the encoded localization layer frame 258(*x*) to the encoded localization layer 150(1).

As described previously herein, in some embodiments, the modified frame index list 250 includes, without limitation, M frame indices denoted herein, in display order, as idx1-idxM, where $1<=idx1<=idxM<=M<=N$. In the same or other embodiments, the incremental encoding engine 260 configures the localization frame encoders 270(1)-270(M) to encode the localized video frames 224(idx1)-224(idxM), respectively, to generate the encoded localization layer frames 258(idx1)-258(idxM), respectively. In some other embodiments, the number of instances of the localization frame encoder 270 can vary and the techniques described herein are modified accordingly. For explanatory purposes, the functionality of the localization frame encoders 270 are depicted and described in greater detail in the context of the localization frame encoder 270(1).

As shown, in some embodiments, the localization frame encoder 270(1) generates the encoded localization layer frame 258(idx1) and a decoded localized video frame 292(idx1) based on the localized video frame 224(idx1), a decoded frame buffer 262(idx1), and the comparison metadata 252. The localization frame encoder 270(1) can implement any number and/or types of encoding or "coding" techniques to generate the encoded localization layer frame 258(idx1). In some embodiments, the localization frame encoder 270(1) can implement any number and/or types of decoding techniques to generate the decoded localized video frame 292(idx1). In some other embodiments, the localization frame encoder 270(1) does not generate any decoded localized video frames.

Although not shown, the localization frame encoder 270(1) can receive and/or determine any number and/or types of encoding parameter values and optionally any number and/or types of decoding parameter values in any technically feasible fashion. Referring back to FIG. 1, in some embodiments, the localized video encoding application 120 generates the encoded original video 132 and each of the encoded localization layers 150(1)-150(K) based on a single set of encoding parameter values. In the same or other embodiments, the localized video encoding application 120 generates the decoded original video 210 and the decoded localized video frame 292(idx1) based on a single set of decoding parameter values.

In some embodiments, the decoded frame buffer 262(idx1) specifies, without limitation, the decoded original video frame 212(idx1), zero or more other decoded original video frames 212, and zero or more decoded localized video frames. The decoded frame(s) specified in the decoded frame buffer 262(idx1) are also referred to herein individually as a "reference frame" and collectively as "reference frames."

In some embodiments, the localization frame encoder 270(1) can identify and exploit zero or more spatial redundancies within the localized video frame 224(idx1), zero or more spatial redundancies between the localized video frame 224(idx1) and the decoded original video frame 212(idx1), and zero or more temporal redundancies between the localized video frame 224(idx1) and each of zero or more other reference frames. As used herein, "exploiting" a redundancy refers to reducing the number of bits used by the encoded localized video frame having the frame index of idx1 to represent the redundancy.

For explanatory purposes, the functionality of the localization frame encoder 270(1) is described herein in the context of the decoded frame buffer 262(idx1) that includes, without limitation, the decoded frame buffer 262(idx1) and at most one other reference frame. More precisely, if idx1 is equal to 1 and therefore the localized video frame 224(idx1) is first in the display order, then the decoded frame buffer 262(idx1) specifies, without limitation, the decoded original video frame 212(idx1). Otherwise, the decoded frame buffer 262(idx1) specifies, without limitation, the decoded original video frame 212(idx1) and a decoded localized video frame 292(idx1−1) that immediately precedes the localized video frame 224(idx1) with respect to the display order.

As shown, in some embodiments, the localization frame encoder 270(1) includes, without limitation, a prediction engine 280, prediction metadata 282, a residual frame 284, quantized coefficients 286, an entropy coding engine 290, the encoded localization layer frame 258(idx), and a partial decoder 278. In some embodiments, the localization frame encoder 270(1) partitions each of the localized video frame 224(idx1), the decoded original video frame 212(idx1), and any other reference frames into any number and/or types of non-overlapping processing units or other non-overlapping portions in any technically feasible fashion. In the same or other embodiments, the localization frame encoder 270(1) determines the sizes and/or types of processing units or other portions in accordance with a video compression and/or an image format.

For instance, in some embodiments, the localization frame encoder 270(1) partitions each of the localized video frame 224(idx1), the decoded original video frame 212(idx1), and any other reference frames into processing units known as macroblocks. In the same or other embodiments, each macroblock can include, without limitation, one or more blocks of samples of each of any number and/or types of color components. For instance, in some embodiments, each macroblock includes, without limitation, four 8×8 blocks of samples for a luma component and a different 8×8 block of samples for each of two chroma components.

In some embodiments, the prediction engine 280 independently processes each of any number of non-overlapping portions of the localized video frame 224(idx1) to determine a co-located portion of a prediction frame (not shown) and a corresponding portion of prediction metadata 282. In this fashion, in some embodiments, the prediction engine 280 determines non-overlapping portions of the prediction frame and the predicted metadata 282. As referred to herein, "co-located" portions of frames are at the same position within the frames. In some embodiments, the portion of the prediction metadata 282 corresponding to a portion of the localized video frame 224(idx1) specifies, without limitation, one or more instructions for reconstructing a co-located portion of the prediction frame. In the same or other embodiments, one or more instructions for reconstructing a portion of the prediction frame specify, without limitation, one or more predictors for the portion of the prediction frame, where each predictor specifies a different portion of the localized video frame 224, the decoded original video frame 212(idx1), or any other reference frame For explanatory purposes, the functionality of the prediction engine 280 in some embodiments is described in greater detail below in the context of non-overlapping portions of frames that are non-overlapping macroblocks included in the frames. Accordingly, in some embodiments, the prediction engine 280 independently processes each of any number of non-overlapping macroblocks included in the localized video frame 224(idx1) to determine a co-located macroblock for a prediction frame (not shown) and a corresponding portion of prediction metadata 282. In this fashion, in some embodiments, the prediction engine 280 determines non-overlapping macroblocks included in the prediction frame and the predicted metadata 282.

In some embodiments, a portion of the prediction metadata 282 corresponding to a macroblock included in the localized video frame 224(idx1) specifies, without limitation, one or more instructions for reconstructing a co-located macroblock included in a prediction frame. As referred to herein, "co-located" macroblocks are macroblocks of the same size at the same positions within different frames. For explanatory purposes, macroblocks included in a prediction frame are also referred to herein as "prediction macroblocks." In some embodiments, one or more instructions for reconstructing a prediction macroblock specify, without limitation, one or more predictors for the prediction macroblock, where each predictor specifies a different macroblock in the localized video frame 224, the decoded original video frame 212(idx1), or any other reference frame.

In some embodiments, one or more instructions specifying a predictor for a prediction macroblock include, without limitation, a reference frame identifier and a motion vector. In the same or other embodiments, the reference frame identifier and the motion vector identify a macroblock in the localized video frame 224, the decoded original video frame 212(idx1), or any other reference frame as a predictor that is used to construct the prediction macroblock in any technically feasible fashion. In some embodiments, the reference frame identifier specifies one of the localized video frame 224, the decoded original video frame 212(idx1), or any other reference frame in any technically feasible fashion. In the same or other embodiments, the motion vector specifies a distance and direction from the prediction macroblock included in a predicted frame to a macroblock in the frame identified by the reference frame identifier.

For explanatory purposes, the functionality of the prediction engine 280 in some embodiments is described in terms of processing a single macroblock included in the localized video frame 224(idx1). The localized video frame 224 that the prediction engine 280 is currently processing is also referred to herein as a "target frame," and a macroblock of the target frame is also referred to herein as a "portion of the target frame" and a "target macroblock."

In some embodiments, to process a target macroblock, the prediction engine 280 determines whether the target macroblock includes any visually perceptible localized video data based on the comparison metadata 252. In some other embodiments, the prediction engine 280 can determine and/or estimate whether the target macroblock includes any visually perceptible localized video data and/or any localized video data in any other technically feasible fashion. For instance, in some embodiments, the prediction engine 280 compares the target macroblock to a co-located macroblock in the decoded original video frame 212(idx1) to estimate whether the target macroblock includes any visibly perceptible localized video data.

In some embodiments, if the prediction engine 280 determines that the target macroblock does not include any visually perceptible localized video data, then the prediction engine 280 sets the prediction macroblock in the prediction frame equal to the co-located macroblock in the decoded original video frame 212(idx1). In the same or other embodiments, the prediction engine 280 adds one or more instructions to the prediction metadata 282 that indicate that the co-located macroblock in the decoded original video frame 212(idx1) is to be reused as the prediction macroblock in the prediction frame. For instance, in some embodiments, the one or more instructions instruct a decoder to set the prediction macroblock equal to the co-located macroblock in the decoded original video frame 212(idx1).

In some embodiments, one or more instructions that instruct a decoder to set the prediction macroblock equal to the co-located macroblock in the decoded original video frame 212(idx1) specify, without limitation, a reference frame identifier corresponding to the decoded original video frame 212(idx1) and a motion vector having a distance of zero. In the same or other embodiments, a motion vector having a distance of zero indicates that a predictor of a prediction macroblock in a prediction frame is a co-located macroblock in a frame corresponding to the reference frame identifier.

If, however, the target macroblock includes visibly perceptible localized video data, then the prediction engine 280 selects zero or more of the macroblocks included in each of the localized video frame 224(idx1), the decoded original video frame 212(idx1), and any number of other reference frames as candidate macroblocks. The prediction engine 280 can select the candidate macroblocks in any technically feasible fashion. For instance, in some embodiments, the prediction engine 280 can implement any number and/or types of search algorithms to select the candidate macroblocks. The prediction engine 280 then evaluates the candidate macroblocks to determine a "best" match macroblock for the target macroblock. The prediction engine 280 can evaluate the candidate macroblocks in any technically feasible fashion.

In some embodiments, for each candidate macroblock, the prediction engine 280 computes a mean square error, a mean absolute difference, a peak signal to noise ratio, or any combination therefore between the pixel values in the target macroblock and the pixel values of a corresponding candidate prediction. For instance, if a candidate macroblock is included in the decoded original video frame 212(idx1), then the corresponding candidate prediction is the candidate macroblock moved to be co-located with the target macroblock. After evaluating the candidate macroblocks, the prediction engine 280 sets the best matched macroblock equal to the candidate macroblock associated with the least amount of error, the highest degree of similarity, or the lowest degree of dissimilarity with respect to the target macroblock.

In some embodiments, the prediction engine 280 sets the prediction macroblock in the prediction frame equal to the best matched macroblock. In the same or other embodiments, the prediction engine 280 adds one or more instructions to the prediction metadata 282 that instruct a decoder to set the prediction macroblock equal to the best matched macroblock. In some embodiments, instruction(s) that instruct a decoder to set the prediction macroblock equal to the best matched macroblock specify, without limitation, a reference frame identifier corresponding to the frame that includes the best matched macroblock and a motion vector that points from the prediction macroblock to the best matched macroblock. More specifically, in some embodiments, the motion vector specifies a distance and a direction from a position of the prediction macroblock within the prediction frame to a position of the best matched macroblock within the frame corresponding to the reference frame identifier. In some embodiments, if the best matched macroblock is co-located with respect to the target macroblock, then the prediction engine 280 sets the distance of the motion vector equal to zero.

In some embodiments, based on a portion of prediction metadata 282 specifying a reference frame identifier and a motion vector identifying a predictor of a prediction macroblock included in a prediction frame, a video decoder determines a reference frame based on the reference frame identifier. The video decoder then maps the position of the prediction macroblock within the prediction frame to a best matched macroblock within the reference frame as per the motion vector. In some embodiments, the decoder implements a virtual reconstructed prediction frame and sets a virtual prediction macroblock included in the virtual reconstructed prediction frame equal to the best matched macroblock. In the same or other embodiments, the decoder copies the best matched macroblock from the reference frame to the prediction macroblock in the reconstructed prediction frame.

In some embodiments, after generating the last prediction macroblock in the prediction frame, the prediction engine 280 subtracts the prediction frame from the target frame to generate the residual frame 284. Accordingly, in some embodiments, the residual frame 284 represents a prediction error between the prediction frame and the target frame in the spatial domain. The localization frame encoder 270(1) then generates the encoded localization layer frame 258 (idx1) that encodes, without limitation, instructions for reconstructing the prediction frame and zero or more modifications to the resulting reconstructed prediction frame to correct or mitigate an associated prediction error. The localization frame encoder 270(1) can generate the encoded localization layer frame 258(1) in any technically feasible fashion.

In some embodiments, the localization frame encoder 270(1) executes any number and/or types of transformation operations on the residual frame 284 to transform the residual frame 284 from a spatial domain to a frequency domain. For instance, in some embodiments, the localization frame encoder 270(1) partitions the residual frame 284 into any number of non-overlapping blocks in any technically feasible fashion. In the same or other embodiments, the localization frame encoder 270(1) transforms the pixel values in each of the blocks of the residual frame 284 from a spatial domain to a frequency domain to generate transform coefficients (not shown). In the same or other embodiments, the localization frame encoder 270(1) can apply any type of 2D linear transform to the pixel values in each of the blocks of the residual frame 284 to generate the transform coefficients. For instance, in some embodiments, the localization frame encoder 270(1) uses, without limitation, a 2D Discrete Cosine Transform (DCT), a Discrete Fourier Transform, a Discrete Sine Transform, or a Discrete Harr Transform to convert pixel values to transform coefficients.

In some embodiments, the localization frame encoder 270(1) applies any number and/or types of quantization operations to the transform coefficients to generate the quantized coefficients 286. The localization frame encoder

270(1) can execute any number and/or types of quantization operations on the transform coefficients to quantize the transform coefficients in any technically feasible fashion. In some embodiments, the localization frame encoder 270(1) executes an instance of the entropy coding engine 290 on the quantized coefficients 286 to generate encoded residual data (not shown). In the same or other embodiments, the localization frame encoder 270(1) executes an instance of the entropy coding engine 290 on the prediction metadata 282 to generate encoded prediction metadata (not shown).

In some embodiments, the entropy coding engine 290 can execute any number and/or types of lossless compression operations and/or implement any number and/or types of lossless compression techniques on any amount and/or types of data or symbols to generate encoded data or codes having a reduced size relative to the data or symbols. For instance, in some embodiments, the entropy coding engine 290 uses run-length coding techniques to replace runs of a repeated symbol with a single symbol and a count. In the same or other embodiments, the entropy coding engine 290 uses variable-length coding techniques to assign shorter codes to symbols associated with higher probabilities and longer codes to symbols associated with lower probabilities.

More specifically, in some embodiments, the entropy coding engine 290 executes any number and/or types of run-length coding operations, any number and/or types of variable-length coding operations, any number and/or types of other lossless compression operations, or any combination thereof on the quantized coefficients 286 to generate encoded residual data having a reduced size relative to the quantized coefficients 286. In the same or other embodiments, the entropy coding engine 290 executes any number and/or types of run-length coding operations, any number and/or types of variable-length coding operations, any number and/or types of other lossless compression operations, or any combination thereof on the prediction metadata 282 to generate encoded prediction metadata (not shown) having a reduced size relative to the prediction metadata 282. As shown, in some embodiments, the localization frame encoder 270(1) generates the encoded localization layer frame 258(idx1) that includes, without limitation, the encoded residual data and the encoded prediction metadata.

In some embodiments, the localization frame encoder 270(1) generates the encoded localization layer frame 258 (idx1) in accordance with one or more video, encoding, and/or compression standards. For instance, in some embodiments, the encoded localization layer frame 258 (idx1) is a P-frame. After the localization frame encoder 270(1) generates the encoded localization layer frame 258 (idx1), the localization frame encoder 270(1) or the incremental encoding engine 260 adds the encoded localization layer frame 258(idx1) to the encoded localization layer 150(1).

In some embodiments, the localization frame encoder 270(1) uses the partial decoder 278 to generate the decoded localized video frame 292(idx1) in any technically feasible fashion that is consistent with the encoded data included in the encoded localization layer frame 258(idx1). In the same or other embodiments, the partial decoder 278 implements any number and/or types of decoding techniques to generate the decoded localized video frame 292(idx1) based on the quantized coefficients 286 and the prediction frame.

More specifically, in some embodiments, the partial decoder 278 inverse quantizes the quantized coefficients 286 in any technically feasible fashion to generate decoded transform coefficients (not shown). For instance, in some embodiments, the partial decoder 278 can execute any number and/or types of inverse quantization operations on the quantized coefficients 286 to generate the decoded transform coefficients. The partial decoder 278 then applies an inverse transform (e.g., an inverse 2D DCT) to each block of decoded transform coefficients to generate a decoded residual frame (not shown). In some embodiments, the decoded residual frame is an inexact replica of the residual frame 284. The partial decoder 278 then adds the decoded residual frame to the prediction frame to generate the decoded localized video frame 292(idx1). Although not shown, in some embodiments, the incremental encoding engine 260 includes the decoded localized video frame 292(idx1) in a decoded frame buffer 262 associated with the frame index (idx1+1).

In some embodiments, the functionality of other instances of the localization frame encoder 270 are the same as the functionality described herein. In particular, and as shown, the localization frame encoder 270(idxM) generates the encoded localization layer frame 258(idxM) and optionally a decoded localized video frame 292(idxM) based on the localized video frame 224(idxM), a decoded frame buffer 262(idxM), and the comparison metadata 252. In the same or other embodiments, the decoded frame buffer 262(idxM) specifies, without limitation, the decoded original video frame 212(idxM) and a decoded localized video frame 292(idxM−1). As persons skilled in the art will recognize, the techniques described herein can be modified to reflect any number and/or types of reference frames.

Although not shown, in some embodiments, the localization encoder 140(1) can generate any amount and/or types of "localization" metadata that is relevant to streaming the localized video 124(1) and/or constructing a corresponding encoded localized video. For instance, in some embodiments, the localization metadata includes, without limitation, any amount and/or types of data that the cloud-based video services 104 or any other software application can use to generate a manifest file. In the same or other embodiments, the localization metadata includes, without limitation, any amount and/or types of data that the playback application 170, any other software application, or any hardware module executing a layer interleaving algorithm can use in conjunction with chunks of the encoded original video 132 and corresponding chunks of the encoded localization layer 150(1) to generate corresponding chunks of the encoded version of the localized video 124(1). In some embodiments, the localization encoder 140(1) and/or the localized video encoding application 120 can transmit any portions of localization metadata to any number of software applications, hardware modules, or any combination thereof.

Figure 3:
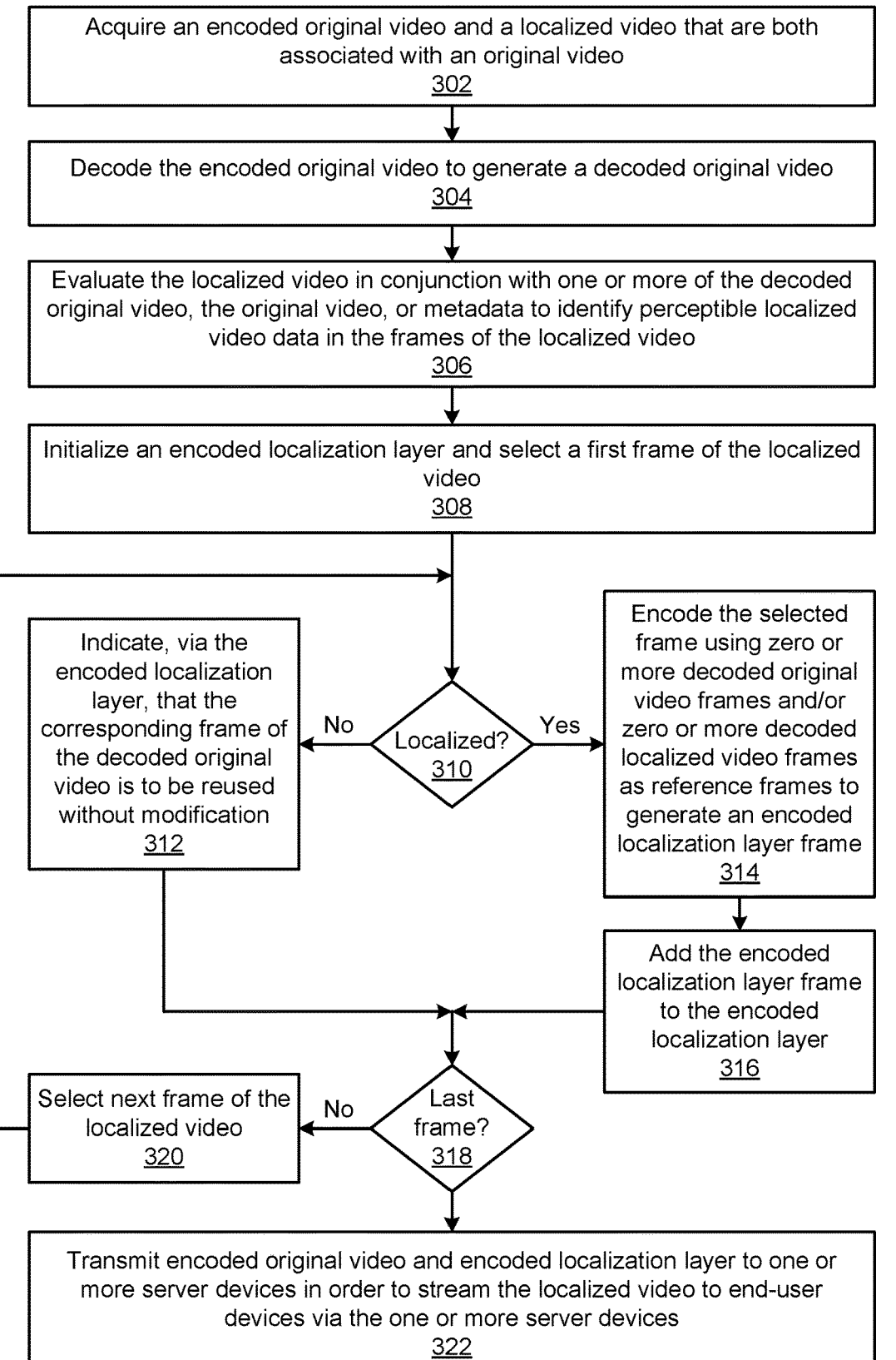
FIG. 3 is a flow diagram of method steps for encoding localized videos, according to various embodiments.

FIG. 3 is a flow diagram of method steps for encoding localized videos, according to various embodiments. Although the method steps are described with reference to the systems of FIGS. 1-2, persons skilled in the art will understand that any system configured to implement the method steps, in any order, falls within the scope of the various embodiments.

As shown, a method 300 begins at step 302, where the localization encoder 140 acquires the encoded original video 132 and the localized video 124 that are associated with the original video 122. At step 304, the localization encoder 140 decodes the encoded original video 132 to generate the decoded original video 210. At step 306, the localization encoder 140 evaluates the localized video 124 in conjunction with one or more of the decoded original video 210, the original video 122, or metadata to identify visibly perceptible localized video data included in the frames of the localized video 124. At step 308, the localization encoder

140 initializes encoded localization layer 150 and selects the first frame of the localized video 124.

At step 310, the localization encoder 140 determines whether the selected frame includes any perceptible localized video data. If, at step 310, the localization encoder 140 determines that the selected frame does not include any visually perceptible localized video data, then the method 300 proceeds to step 312. At step 312, the localization encoder 140 indicates, via the encoded localization layer 150, that the corresponding frame of the decoded original video 210 is to be reused without modification. The method 300 then proceeds directly to step 318.

If, however, at step 310, the localization encoder 140 determines that the selected frame includes visibly perceptible localized video data, then the method 300 proceeds directly to step 314. At step 314, the localization frame encoder 270 encodes the selected frame using zero or more decoded original video frames 212 and/or zero or more decoded localized video frames as reference frames to generate the encoded localization layer frame 258 corresponding to the selected frame. At step 316, the localization encoder 140 adds the encoded localization layer frame 258 corresponding to the selected frame to the encoded localization layer 150.

At step 318, the localization encoder 140 determines whether the selected frame is the last frame of the localized video 124. If, at step 318, the localized encoder 140 determines that the selected frame is not the last frame of the localized video 124, then the method 300 proceeds to step 320. At step 320, the localized encoder 140 selects the next frame of the localized video 124, and the method 300 returns to step 310, where the localized encoder 140 determines whether the selected frame includes any visually perceptible localized video data.

If, however, at step 318, the localization encoder 140 determines that the selected frame is the last frame of the localized video 124, then the method 300 proceeds directly to step 322. At step 322, the localized video encoding application 120 transmits the encoded original video 132 and the encoded localization layer 150 to one or more server devices in order to stream the localized video 124 to end-user devices via the one or more server devices. The method 300 then terminates.

In sum, the disclosed techniques can be used to reduce the amount of original video data that is re-encoded when encoding localized videos. In some embodiments, a localized video encoding application encodes an original video to generate an encoded original video. The localized video encoding application executes a localization encoder on a localized video and the encoded original video. The localization encoder decodes the encoded original video to generate a decoded original video. The localization encoder compares the frames of the localized video and the decoded original video to generate a list of the frames of the localized video that include visibly perceptible localized video data and therefore differ noticeably from the corresponding portions of the decoded original video when displayed. In some embodiments, the localization encoder also generates comparison metadata that indicates zero or more portions of each frame of the localized video that include perceptible localized video data.

The localization encoder initializes an encoded localization layer and then encodes each frame of the localized video in a display order. For each frame of the localized video, if the frame of the localized video does not include visually perceptible localized video data, then the localization encoder indicates, via the encoded localization layer, that the corresponding frame of the decoded original video is to be reused without modification as part of a decoded localized video.

If, however, the frame of the localized video includes visually perceptible localized video data, then the localization encoder adds the corresponding frame of the decoded original video to a decoded frame buffer of decoded frames that are available for reuse during encoding. The localization encoder then encodes the frame of the localized video based on the decoded frame buffer to generate an encoded localization layer frame. In some embodiments, the encoded localization layer frame includes, without limitation, encoded prediction metadata and optionally encoded residual data. In some embodiments, the encoded prediction metadata encodes, without limitation, instructions for constructing a reconstructed prediction frame based on one or more portions of a corresponding frame of the decoded original video and/or one or more portions of one or more other decoded frames specified in the decoded frame buffer. Notably, the reconstructed prediction frame can include, without limitation, any number of copied portions of the corresponding decoded original video frame and each copied portion of the corresponding decoded original video frame can optionally be moved within the reconstructed prediction frame relative to the decoded original video frame. In some embodiments, the encoded residual data specifies modifications to the reconstructed prediction frame that mitigate any residual error in order to generate a frame of a decoded localized video.

In some embodiments, the encoded original video and the encoded localization layer are independently stored and delivered via separate streams to end-user devices. A playback application executing on an end-user device constructs each encoded localized video chunk based on a corresponding encoded original video chunk and a corresponding encoded localization layer chunk. More specifically, the playback application identifies each frame of a localized video chunk that differs from the corresponding frame of the original video chunk based on the encoded localized video chunk. For each identified frame of the localized video chunk, the playback application marks a corresponding frame of the encoded original video chunk as a reference-only frame to generate an encoded base layer chunk. The playback application then interleaves the frames of the encoded base layer chunk with the frames of the encoded localization layer chunk to generate an encoded localized video chunk.

At least one technical advantage of the disclosed techniques relative to the prior art is that, with the disclosed techniques, the amount of original video data that is re-encoded when encoding a localized video can be reduced. In that regard, each frame of an encoded localization layer can specify the reuse of any number of portions (including all) of a frame of corresponding reconstructed original video. As a result, the amount of memory used to store the encoded localization layer chunks that are used to construct the encoded localized video chunks can be substantially reduced relative to what would be required to store the encoded localized video chunks using prior art techniques. Another advantage of the disclosed techniques is that storing encoded localization layer chunks instead of encoded localized video chunks in order to stream localized videos via a CDN can increase the cache efficiency of the CDN and, in turn, the QoE for end-users. These technical advantages provide one or more technical advancements over prior art approaches.

1. In some embodiments, a computer-implemented method for encoding localized videos comprises computing a prediction frame based on a target frame of a localized video and at least a portion of a reference frame of a decoded original video; computing a residual frame based on the prediction frame and the target frame of the localized video; performing one or more encoding operations on the residual frame to generate a frame of an encoded localization layer; and transmitting the frame of the encoded localization layer and at least one frame of an encoded original video to another device for decoding.

2. The computer-implemented method of clause 1, wherein computing the prediction frame comprises determining that a degree of similarity between the portion of the reference frame of the decoded original video and a portion of the target frame of the localized video is higher than a degree of similarity between a portion of a frame of a decoded localized video and the portion of the target frame of the localized video; and generating prediction metadata indicating that the portion of the reference frame of the decoded original video is a predictor for a portion of the prediction frame that corresponds to the portion of the target frame.

3. The computer-implemented method of clauses 1 or 2, further comprising performing one or more decoding operations on encoded residual data included in the frame of the encoded localization layer to generate a frame of a decoded localized video.

4. The computer-implemented method of any of clauses 1-3, wherein performing the one or more encoding operations on the residual frame comprises executing at least one of a transformation operation, a quantization operation, or a lossless compression operation on the residual frame to generate encoded residual data.

5. The computer-implemented method of any of clauses 1-4, wherein the frame of the encoded localization layer includes at least one of encoded residual data associated with the residual frame or encoded prediction metadata associated with the prediction frame.

6. The computer-implemented method of any of clauses 1-5, further comprising decoding the at least one frame of the encoded original video to generate the reference frame of the decoded original video.

7. The computer-implemented method of any of clauses 1-6, wherein computing the residual frame comprises subtracting the prediction frame from the target frame of the localized video.

8. The computer-implemented method of any of clauses 1-7, further comprising performing one or more comparison operations between a frame of the localized video and a frame of the decoded original video to determine that the frame of the localized video does not include any visually perceptible modifications attributable to video localization; and indicating, via the encoded localization layer, that the frame of the decoded original video is to be reused as part of a decoded localized video.

9. The computer-implemented method of any of clauses 1-8, further comprising marking the at least one frame of the encoded original video as a reference-only frame to generate an encoded base layer; and interleaving a plurality of frames included in the encoded base layer with a plurality of frames included in the encoded localization layer to generate at least one chunk of an encoded localized video.

10. The computer-implemented method of any of clauses 1-9, wherein the frame of the encoded localization layer comprises a predicted frame or a bidirectional predicted frame.

11. In some embodiments, one or more non-transitory computer readable media include instructions that, when executed by one or more processors, cause the one or more processors to encode localized videos by performing the steps of computing a prediction frame based on a target frame of a localized video and at least a portion of a reference frame of a decoded original video; computing a residual frame based on the prediction frame and the target frame of the localized video; performing one or more encoding operations on the residual frame to generate a frame of an encoded localization layer; and transmitting the frame of the encoded localization layer and at least one frame of an encoded original video to another device for decoding.

12. The one or more non-transitory computer readable media of clause 11, wherein computing the prediction frame comprises determining that a degree of similarity between the portion of the reference frame of the decoded original video and a portion of the target frame of the localized video is higher than a degree of similarity between a second portion of the reference frame of the decoded original video and the portion of the target frame of the localized video.

13. The one or more non-transitory computer readable media of clauses 11 or 12, further comprising encoding a motion vector that points from a portion of the prediction frame to the portion of the reference frame of the decoded original video to generate encoded prediction metadata that is included in the frame of the encoded localization layer.

14. The one or more non-transitory computer readable media of any of clauses 11-13, wherein performing the one or more encoding operations on the residual frame comprises executing at least one of a transformation operation, a quantization operation, or a lossless compression operation on the residual frame to generate encoded residual data.

15. The one or more non-transitory computer readable media of any of clauses 11-14, wherein the frame of the encoded localization layer includes at least one of encoded residual data associated with the residual frame or encoded prediction metadata associated with the prediction frame.

16. The one or more non-transitory computer readable media of any of clauses 11-15, further comprising decoding the encoded original video to generate the decoded original video.

17. The one or more non-transitory computer readable media of any of clauses 11-16, wherein computing the residual frame comprises subtracting the prediction frame from the target frame of the localized video.

18. The one or more non-transitory computer readable media of any of clauses 11-17, wherein the frame of the encoded localization layer is subsequently decoded in conjunction with the at least one frame of the encoded original video when generating a first chunk of a decoded localized video.

19. The one or more non-transitory computer readable media of any of clauses 11-18, further comprising marking the at least one frame of the encoded original video as a reference-only frame to generate an encoded base layer; and interleaving a plurality of frames included in the encoded base layer with a plurality of frames included in the encoded localization layer to generate at least one chunk of an encoded localized video.

20. In some embodiments, a system comprises one or more memories storing instructions and one or more processors coupled to the one or more memories that, when executing the instructions, perform the steps of computing a prediction frame based on a target frame of a localized video and at least a portion of a reference frame of a decoded original video; computing a residual frame based on the prediction frame and the target frame of the localized video; performing one or more encoding operations on the residual frame to generate a frame of an encoded localization layer; and transmitting the frame of the encoded localization layer and at least one frame of an encoded original video to another device for decoding.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for encoding localized videos, the method comprising:

computing a prediction frame based on a target frame of a localized video and at least a first portion of a reference frame of a decoded original video, wherein the localized video is different from the decoded original video;

computing a residual frame based on the prediction frame and the target frame of the localized video;

performing one or more encoding operations on the residual frame to generate a frame of an encoded localization layer associated with the localized video, wherein the encoded localization layer includes metadata indicating that one or more portions of the reference frame of the decoded original video are to be reused without modification when decoding the encoded localization layer, wherein the metadata is separate from residual data that is based on a difference between one or more portions of the prediction frame and one or more portions of the target frame; and transmitting the frame of the encoded localization layer and at least one frame of an encoded original video to another device for decoding.

2. The computer-implemented method of claim 1, wherein computing the prediction frame comprises:

determining that a degree of similarity between the first portion of the reference frame of the decoded original video and a first portion of the target frame of the localized video is higher than a degree of similarity between a portion of a frame of a decoded localized video and the first portion of the target frame of the localized video; and generating the metadata indicating that the first portion of the reference frame of the decoded original video is a predictor for a first portion of the prediction frame that corresponds to the first portion of the target frame.

3. The computer-implemented method of claim 1, further comprising performing one or more decoding operations on the residual data included in the frame of the encoded localization layer to generate a frame of a decoded localized video.

4. The computer-implemented method of claim 1, wherein performing the one or more encoding operations on the residual frame comprises executing at least one of a transformation operation, a quantization operation, or a lossless compression operation on the residual frame to generate the residual data.

5. The computer-implemented method of claim 1, wherein the frame of the encoded localization layer includes the residual data associated with the residual frame.

6. The computer-implemented method of claim 1, further comprising decoding the at least one frame of the encoded original video to generate the reference frame of the decoded original video.

7. The computer-implemented method of claim 1, wherein computing the residual frame comprises subtracting the prediction frame from the target frame of the localized video.

8. The computer-implemented method of claim 1, further comprising:

performing one or more comparison operations between a frame of the localized video and a frame of the decoded original video to determine that the frame of the localized video does not include any visually perceptible modifications attributable to video localization; and indicating, via the metadata included in the encoded localization layer, that the frame of the decoded original video is to be reused as part of a decoded localized video.

9. The computer-implemented method of claim 1, further comprising:

marking the at least one frame of the encoded original video as a reference-only frame to generate an encoded base layer; and interleaving a plurality of frames included in the encoded base layer with a plurality of frames included in the encoded localization layer to generate at least one chunk of an encoded localized video.

10. The computer-implemented method of claim 1, wherein the frame of the encoded localization layer comprises a predicted frame or a bidirectional predicted frame.

11. The computer-implemented method of claim 1, wherein the one or more portions of the prediction frame correspond to one or more second portions of the reference frame that are associated with one or more lip movements of one or more speakers, and the one or more portions of the reference frame of the decoded original video that are to be reused without modification when decoding the encoded localization layer comprise a remainder of the reference frame outside of the one or more second portions of the reference frame.

12. One or more non-transitory computer readable media including instructions that, when executed by one or more processors, cause the one or more processors to encode localized videos by performing the steps of:

computing a prediction frame based on a target frame of a localized video and at least a first portion of a reference frame of a decoded original video, wherein the localized video is different from the decoded original video;

computing a residual frame based on the prediction frame and the target frame of the localized video;

performing one or more encoding operations on the residual frame to generate a frame of an encoded localization layer associated with the localized video, wherein the encoded localization layer includes metadata indicating that one or more portions of the reference frame of the decoded original video are to be reused without modification when decoding the encoded localization layer, wherein the metadata is separate from residual data that is based on a difference between one or more portions of the prediction frame and one or more portions of the target frame; and transmitting the frame of the encoded localization layer and at least one frame of an encoded original video to another device for decoding.

13. The one or more non-transitory computer readable media of claim 12, wherein computing the prediction frame comprises determining that a degree of similarity between the first portion of the reference frame of the decoded original video and a first portion of the target frame of the localized video is higher than a degree of similarity between a second portion of the reference frame of the decoded original video and the first portion of the target frame of the localized video.

14. The one or more non-transitory computer readable media of claim 12, further comprising encoding a motion vector that points from a first portion of the prediction frame to the first portion of the reference frame of the decoded original video to generate the metadata that is included in the frame of the encoded localization layer.

15. The one or more non-transitory computer readable media of claim 12, wherein performing the one or more encoding operations on the residual frame comprises executing at least one of a transformation operation, a quantization operation, or a lossless compression operation on the residual frame to generate the residual data.

16. The one or more non-transitory computer readable media of claim 12, wherein the frame of the encoded localization layer includes the residual data associated with the residual frame.

17. The one or more non-transitory computer readable media of claim 12, further comprising decoding the encoded original video to generate the decoded original video.

18. The one or more non-transitory computer readable media of claim 12, wherein computing the residual frame comprises subtracting the prediction frame from the target frame of the localized video.

19. The one or more non-transitory computer readable media of claim 12, wherein the frame of the encoded localization layer is subsequently decoded in conjunction with the at least one frame of the encoded original video when generating a first chunk of a decoded localized video.

20. The one or more non-transitory computer readable media of claim 12, further comprising:

marking the at least one frame of the encoded original video as a reference-only frame to generate an encoded base layer; and interleaving a plurality of frames included in the encoded base layer with a plurality of frames included in the encoded localization layer to generate at least one chunk of an encoded localized video.

21. A system comprising:

one or more memories storing instructions; and one or more processors coupled to the one or more memories that, when executing the instructions, perform the steps of:

computing a prediction frame based on a target frame of a localized video and at least a first portion of a reference frame of a decoded original video, wherein the localized video is different from the decoded original video;

computing a residual frame based on the prediction frame and the target frame of the localized video;

performing one or more encoding operations on the residual frame to generate a frame of an encoded localization layer associated with the localized video, wherein the encoded localization layer includes metadata indicating that one or more portions of the reference frame of the decoded original video are to be reused without modification when decoding the encoded localization layer, wherein the metadata is separate from residual data that is based on a difference between one or more portions of the prediction frame and one or more portions of the target frame; and transmitting the frame of the encoded localization layer and at least one frame of an encoded original video to another device for decoding.

\* \* \* \* \*